(12) United States Patent
Fujita et al.

(10) Patent No.: US 9,215,350 B2
(45) Date of Patent: Dec. 15, 2015

(54) SOUND PROCESSING METHOD, SOUND PROCESSING SYSTEM, VIDEO PROCESSING METHOD, VIDEO PROCESSING SYSTEM, SOUND PROCESSING DEVICE, AND METHOD AND PROGRAM FOR CONTROLLING SAME

(75) Inventors: Naotake Fujita, Tokyo (JP); Toshiyuki Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/131,580

(22) PCT Filed: Jul. 13, 2012

(86) PCT No.: PCT/JP2012/068535
§ 371 (c)(1),
(2), (4) Date: Jan. 8, 2014

(87) PCT Pub. No.: WO2013/008956
PCT Pub. Date: Jan. 17, 2013

(65) Prior Publication Data
US 2014/0139739 A1 May 22, 2014

(30) Foreign Application Priority Data
Jul. 14, 2011 (JP) ................................. 2011-155541

(51) Int. Cl.
*H04N 5/04* (2006.01)
*G10L 19/018* (2013.01)
*G10L 25/48* (2013.01)

(52) U.S. Cl.
CPC ................ *H04N 5/04* (2013.01); *G10L 19/018* (2013.01); *G10L 25/48* (2013.01)

(58) Field of Classification Search
USPC ......................................................... 348/515
See application file for complete search history.

(56) References Cited

U.S. PATENT DOCUMENTS

| 2005/0228649 | A1* | 10/2005 | Harb et al. | ..................... 704/205 |
| 2006/0140413 | A1* | 6/2006 | Abe et al. | ........................ 381/56 |

FOREIGN PATENT DOCUMENTS

| JP | 2002-116768 | 4/2002 |
| JP | 2003-044077 | 2/2003 |

(Continued)

OTHER PUBLICATIONS

Pedro Cano et al., "A Review of Algorithms for Audio Fingerprinting," International Workshop on Multimedia Signal Processing, Dec. 2002.

(Continued)

*Primary Examiner* — Jefferey Harold
*Assistant Examiner* — Michael Teitelbaum
(74) *Attorney, Agent, or Firm* — Finnegan, Henderson, Farabow, Garrett & Dunner LLP

(57) ABSTRACT

A sound processing device according to the present invention includes: a time-frequency analysis means which generates a time-frequency plane from a sound signal through time-frequency analysis; a region characteristic amount extraction means which, for a plurality of partial region pairs which is defined on the time-frequency plane and of which at least either of shapes of two partial regions or positions of the two partial regions differ from one another, extracts a region characteristic amount from each partial region; and a sound identifier generation means which generates a sound identifier which identifies the sound by using the region characteristic amount from the each partial region.

10 Claims, 34 Drawing Sheets

(56) References Cited

FOREIGN PATENT DOCUMENTS

| JP | 2007-065659 | | 3/2007 |
|---|---|---|---|
| JP | 2008-145505 | | 6/2008 |
| JP | 2009-036862 | | 2/2009 |
| JP | 2009-276776 | | 11/2009 |
| WO | WO2010146786 | * | 12/2010 |

OTHER PUBLICATIONS

Jaap Haitsma et al., "A Highly Robust Audio Fingerprinting System", ISMIR 2002 3$^{rd}$ International Conference on Music Information Retrieval.

Yasushi Inoguchi et al., "Super speed detection of an audio electronic fingerprint via the internet for proper music circulation", The Telecommunications Advancement Foundation, Research Investigation report No. 24, pp. 604-615, 2009.

International Search Report and Written Opinion mailed Oct. 30, 2012.

M. Goto, "A Chorus Section Detection Method for Musical Audio Signals and Its Application to a Music Listening Station", IEEE Transactions on Audio, Speech, and Language Processing, vol. 14, No. 5, pp. 1783-1794, Sep. 2006.

* cited by examiner

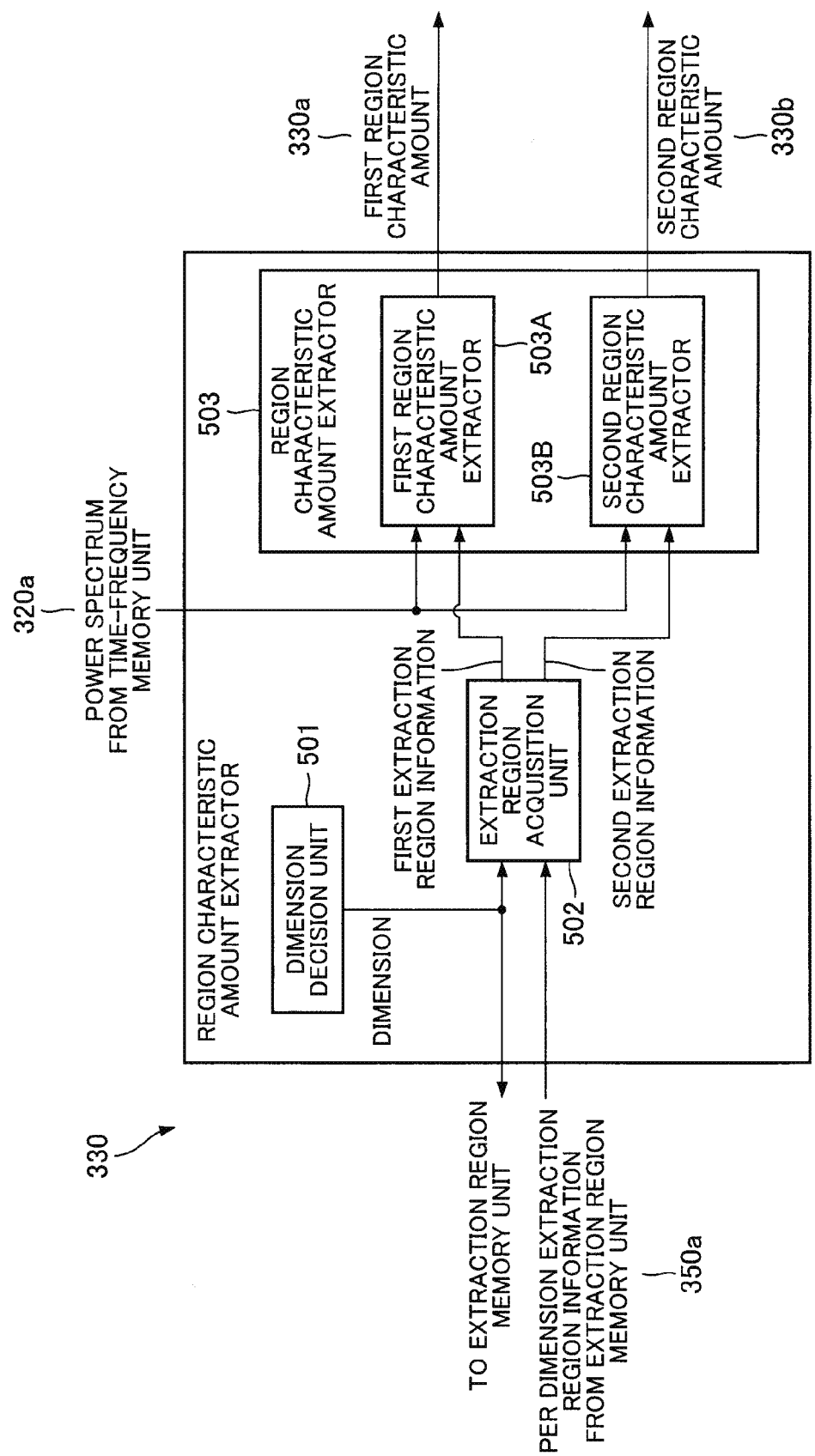

FIG. 6A

| DIMENSION | FIRST EXTRACTION REGION INFORMATION | | | | SECOND EXTRACTION REGION INFORMATION | | | |
|---|---|---|---|---|---|---|---|---|
| | FIRST COORDINATE | SECOND COORDINATE | THIRD COORDINATE | FOURTH COORDINATE | FIRST COORDINATE | SECOND COORDINATE | THIRD COORDINATE | FOURTH COORDINATE |
| FIRST DIMENSION | | | | | | | | |
| SECOND DIMENSION | | | | | | | | |
| THIRD DIMENSION | | | | | | | | |
| ... | | | | | | | | |
| n-TH DIMENSION | | | | | | | | |

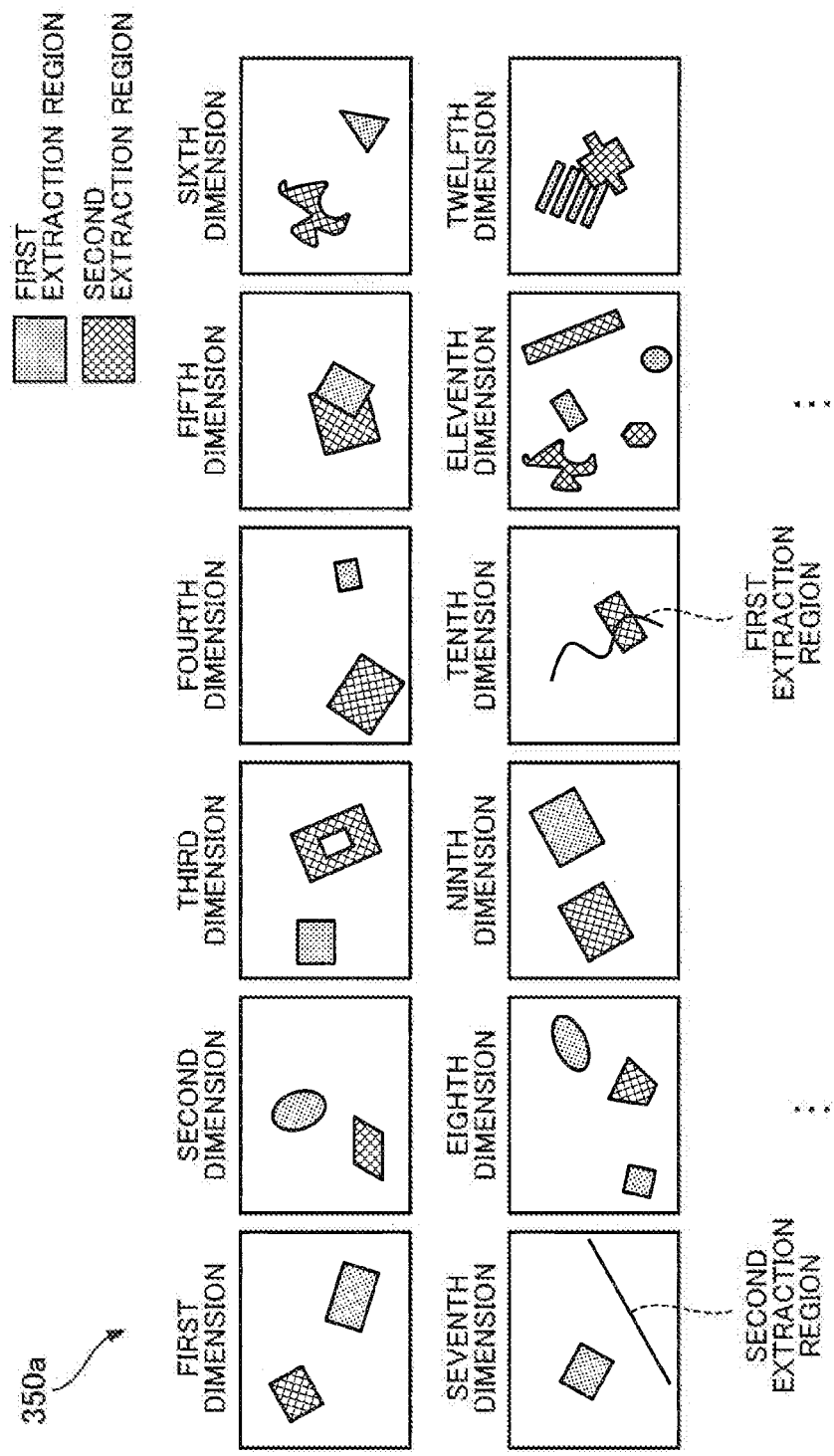

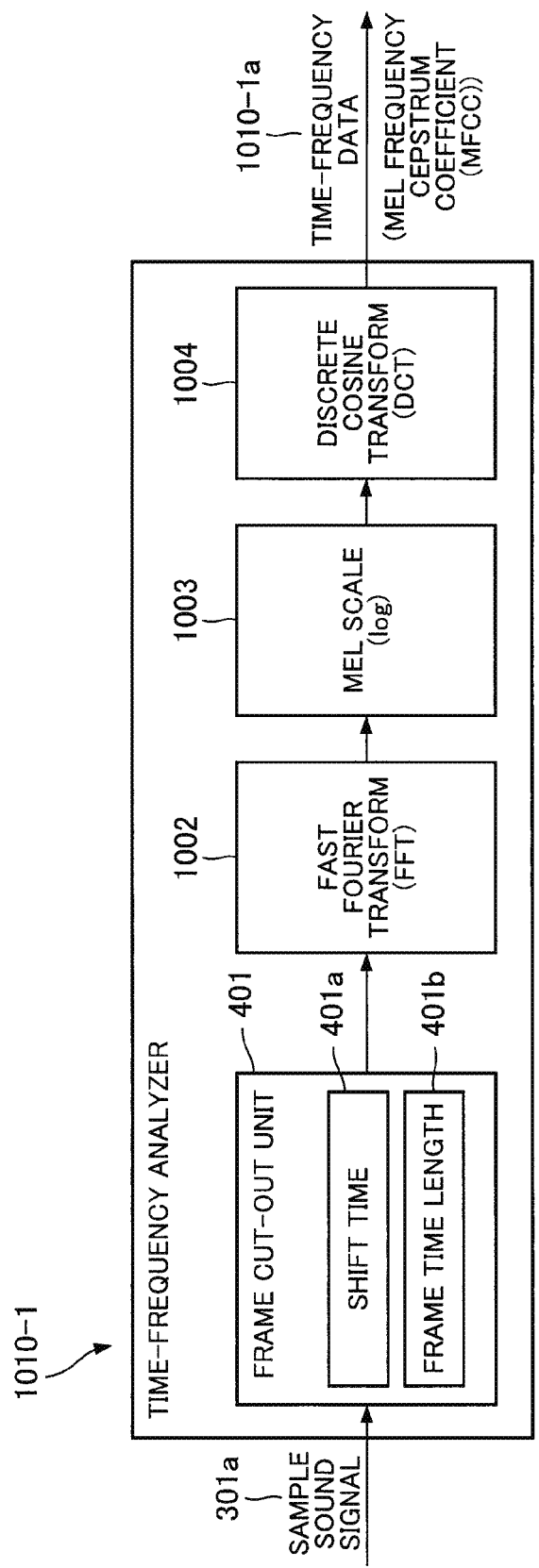

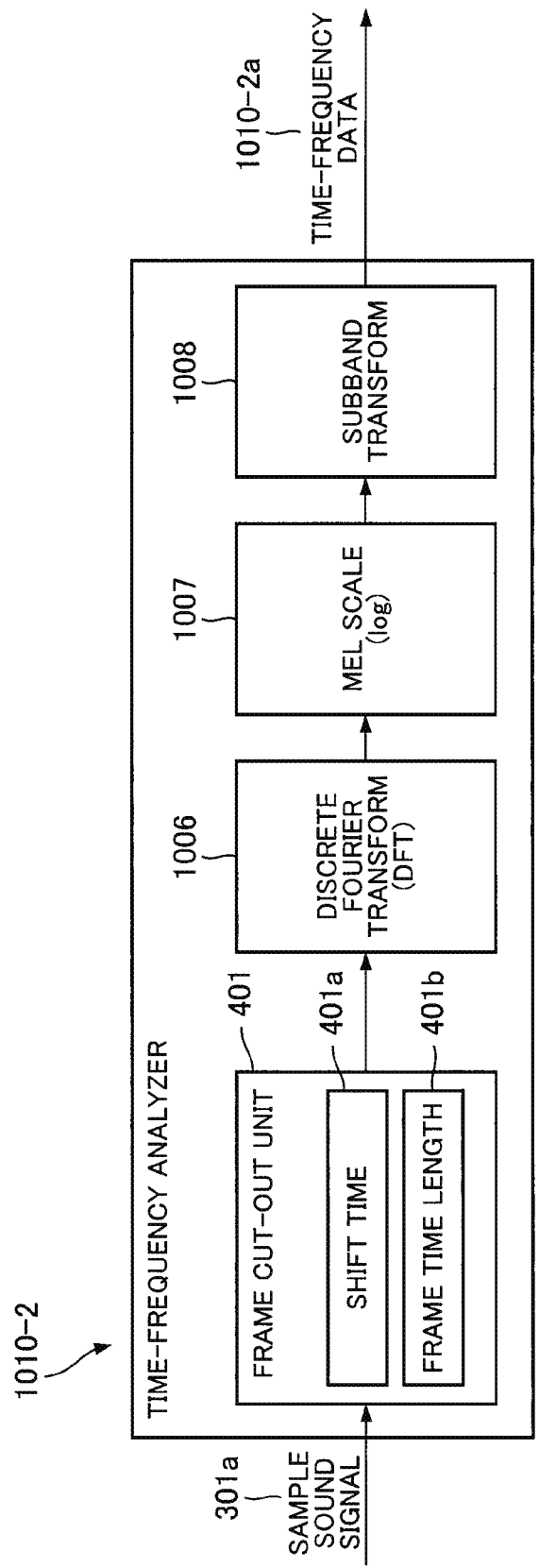

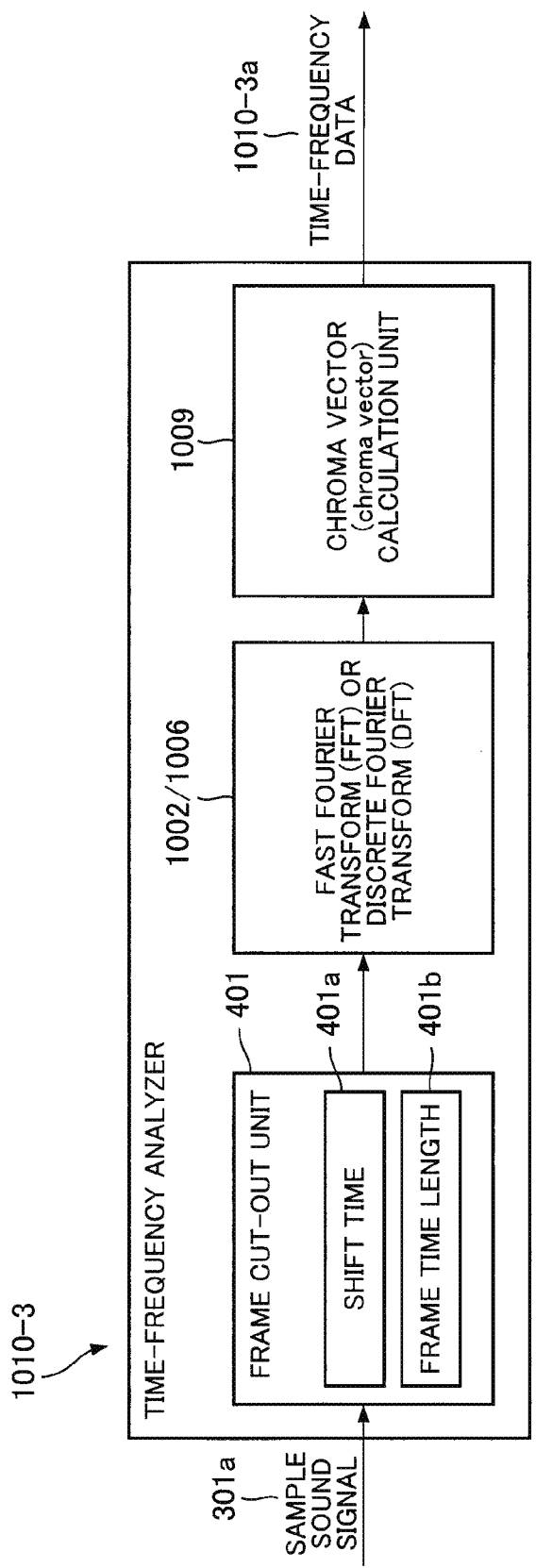

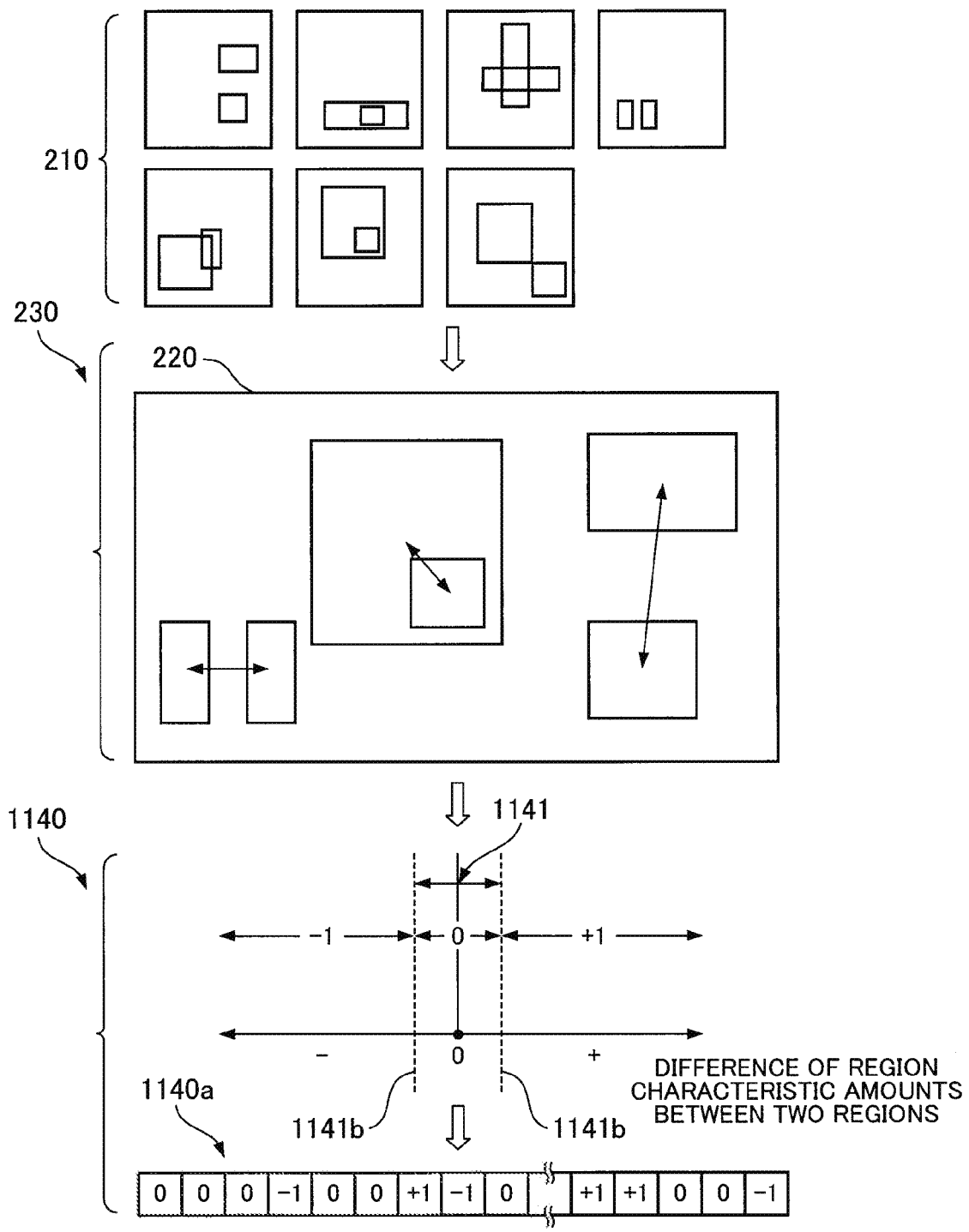

| DIMENSION | REGION CHARACTERISTIC AMOUNT EXTRACTION METHOD |
|---|---|
| FIRST DIMENSION | POWER MEAN VALUE |
| SECOND DIMENSION | POWER MAXIMUM VALUE |
| THIRD DIMENSION | POWER MEDIAN VALUE (MEDIAN) |
| FOURTH DIMENSION | POWER MODE VALUE |
| FIFTH DIMENSION | POWER VALUE AT 30% POSITION FROM HIGHEST RANK IN SORTED PERMUTATION |
| SIXTH DIMENSION | POWER MEAN VALUE AFTER TIME SCALE TRANSFORM |
| SEVENTH DIMENSION | POWER MEAN VALUE AFTER FREQUENCY SCALE TRANSFORM |
| EIGHTH DIMENSION | POWER MEAN VALUE AFTER TIME/FREQUENCY SCALE TRANSFORM |
| NINTH DIMENSION | NUMBER OF PULSES OVER THRESHOLD VALUE |
| TENTH DIMENSION | FIRST PEAK FREQUENCY |
| ELEVENTH DIMENSION | SECOND PEAK FREQUENCY |
| TWELFTH DIMENSION | POWER STANDARD DEVIATION |
| ⋮ | |
| n-TH DIMENSION | ... |

1701     1702

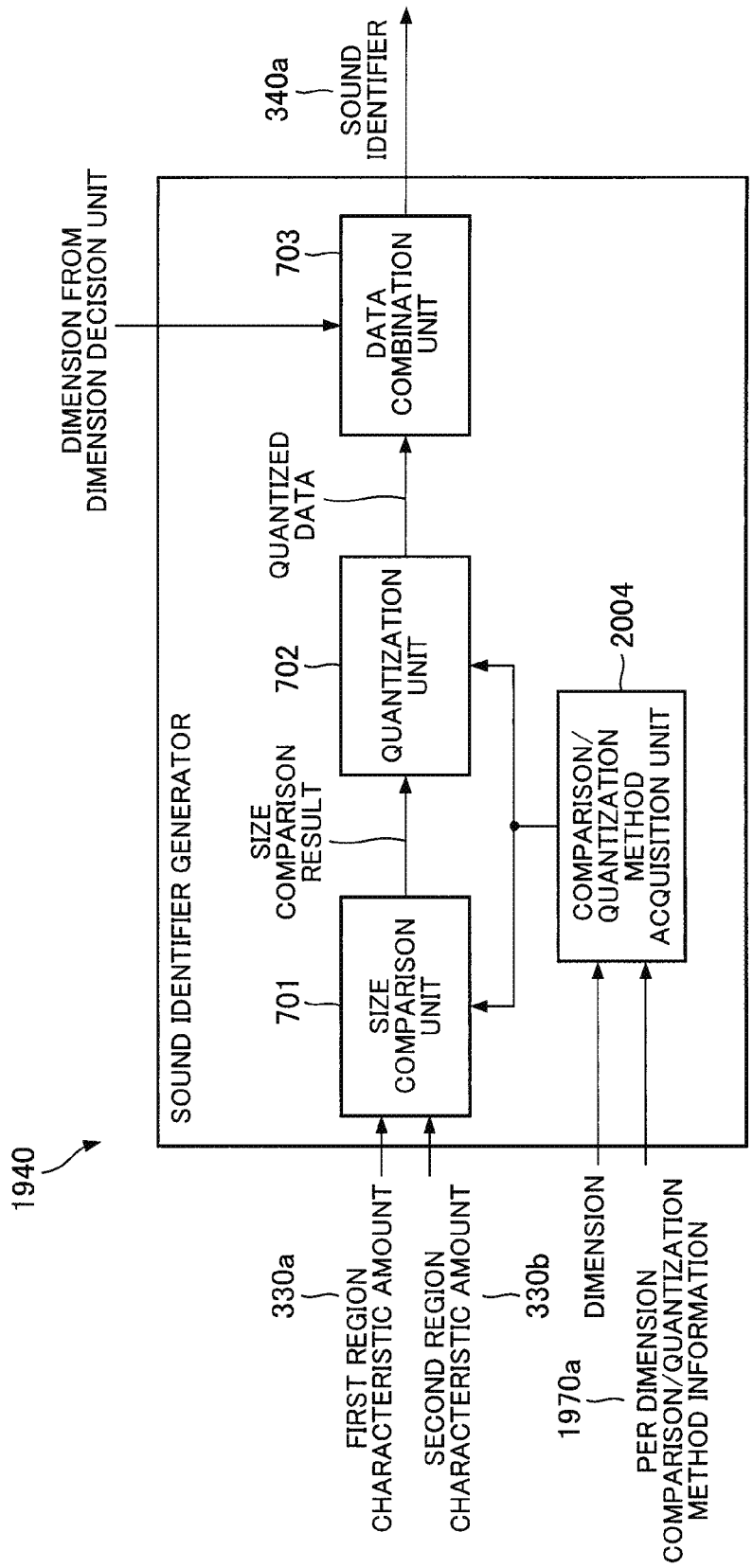

| DIMENSION | COMPARISON/QUANTIZATION METHOD |
|---|---|
| FIRST DIMENSION | COMPARISON/QUANTIZATION METHOD A |
| SECOND DIMENSION | IN COMPARISON/QUANTIZATION METHOD E, REPRESENTATIVE VECTORS ARE [200, 50, 50], [50, 200, 50] AND [50, 50, 200] |
| THIRD DIMENSION | IN COMPARISON/QUANTIZATION METHOD B, th = 3 |
| FOURTH DIMENSION | IN COMPARISON/QUANTIZATION METHOD F, M = 2 |
| FIFTH DIMENSION | IN COMPARISON/QUANTIZATION METHOD B, th = 5 |
| SIXTH DIMENSION | COMPARISON/QUANTIZATION METHOD A |
| SEVENTH DIMENSION | IN COMPARISON/QUANTIZATION METHOD F, M = 3 |
| EIGHTH DIMENSION | IN COMPARISON/QUANTIZATION METHOD G, MAKE POINT AT 30% FROM LOWEST RANK IN SORTED PERMUTATION OF ABSOLUTE VALUES OF DIFFERENCE VALUES AS THRESHOLD VALUE TH |
| NINTH DIMENSION | IN COMPARISON/QUANTIZATION METHOD C, QUANTIZE INTO FIVE LEVELS |
| TENTH DIMENSION | IN COMPARISON/QUANTIZATION METHOD H, DECIDE THRESHOLD VALUE th SO THAT PROPORTION OF QUANTIZED INDICES MAY BECOME EVEN |
| ELEVENTH DIMENSION | IN COMPARISON/QUANTIZATION METHOD F, M = 5 |
| TWELFTH DIMENSION | IN COMPARISON/QUANTIZATION METHOD B, th = 10 |
| ⋮ | |
| n-TH DIMENSION | IN COMPARISON/QUANTIZATION METHOD B, th = 10 |

| DIMENSION | SAMPLING METHOD (2502) | FRAME TIME LENGTH / SHIFT TIME (2503) | TIME-FREQUENCY ANALYSIS METHOD (2504) | REGION CHARACTERISTIC AMOUNT EXTRACTION METHOD (2505) | COMPARISON/ QUANTIZATION METHOD (2506) |
|---|---|---|---|---|---|
| FIRST DIMENSION | 48kHz | 30ms/10ms | WAVELET TRANSFORM | POWER MEAN VALUE | COMPARISON/QUANTIZATION METHOD A |
| SECOND DIMENSION | 48kHz | 30ms/10ms | WAVELET TRANSFORM | POWER MEAN VALUE | COMPARISON/QUANTIZATION METHOD A |
| THIRD DIMENSION | 48kHz | 30ms/10ms | WAVELET TRANSFORM | POWER MAXIMUM VALUE | COMPARISON/QUANTIZATION METHOD A |
| FOURTH DIMENSION | 48kHz | 30ms/10ms | WAVELET TRANSFORM | POWER MAXIMUM VALUE | COMPARISON/QUANTIZATION METHOD A |
| FIFTH DIMENSION | 44.1kHz | 100ms/10ms | WAVELET TRANSFORM | POWER MEDIAN VALUE (MEDIAN) | COMPARISON/QUANTIZATION METHOD A |
| SIXTH DIMENSION | 44.1kHz | 100ms/10ms | WAVELET TRANSFORM | POWER MODE VALUE | COMPARISON/QUANTIZATION METHOD A |
| SEVENTH DIMENSION | 44.1kHz | 100ms/10ms | FFT | NUMBER OF PULSES OVER THRESHOLD VALUE | COMPARISON/QUANTIZATION METHOD A |
| EIGHTH DIMENSION | 44.1kHz | 100ms/10ms | FFT | NUMBER OF PULSES OVER THRESHOLD VALUE | COMPARISON/QUANTIZATION METHOD A |
| NINTH DIMENSION | 100kHz→44.1kHz | 300ms/12ms | FFT | FIRST PEAK FREQUENCY | IN COMPARISON/QUANTIZATION METHOD B, th = 3 |
| TENTH DIMENSION | 100kHz→44.1kHz | 300ms/12ms | FFT | FIRST PEAK FREQUENCY | IN COMPARISON/QUANTIZATION METHOD B, th = 5 |
| ELEVENTH DIMENSION | 100kHz→44.1kHz | 300ms/12ms | FFT | SECOND PEAK FREQUENCY | IN COMPARISON/QUANTIZATION METHOD B, th = 10 |
| TWELFTH DIMENSION | 100kHz→44.1kHz | 300ms/12ms | FFT | POWER STANDARD DEVIATION | IN COMPARISON/QUANTIZATION METHOD F, M = 2 |
| ... | | | | | |
| n-TH DIMENSION | 100kHz→48kHz | 370ms/12ms | CHROMA VECTOR | POWER STANDARD DEVIATION | IN COMPARISON/QUANTIZATION METHOD F, M = 10 |

(2501)

SOUND PROCESSING METHOD, SOUND PROCESSING SYSTEM, VIDEO PROCESSING METHOD, VIDEO PROCESSING SYSTEM, SOUND PROCESSING DEVICE, AND METHOD AND PROGRAM FOR CONTROLLING SAME

CROSS-REFERENCE TO RELATED PATENT APPLICATIONS

This application is a National Stage Entry of International Application No. PCT/JP2012/068535, filed Jul. 13, 2012, which claims priority from Japanese Patent Application No. 2011-155541, filed Jul, 14, 2011. The entire contents of the above-referenced applications are expressly incorporated herein by reference.

TECHNICAL FIELD

The present invention relates to a generation technology of an identifier which identifies a characteristic of a sound and a utilization technology for same. Here, the sound in this description is used as a concept including all sounds including a voice and a composition (music).

BACKGROUND ART

In the technical field mentioned above, as a sound identifier which identifies the characteristic of the sound, an audio fingerprint (audio electronic fingerprint) which is obtained by analyzing a sound signal is known.

For example, a sound processing system in non-patent document 1 cuts out frames of 25 ms which overlap while shifting from a sampled sound signal for 5-10 ms. And the sound processing system performs fast Fourier transform (FFT: Fast Fourier Transform) processing, logarithm processing and discrete cosine transform (DCT: Discrete Cosine Transform) processing to the sound signal in the cuts out frames and generates mel frequency cepstrum. The sound processing system takes out 12th-16th dimensions which are lower dimensions of the mel frequency cepstrum as a mel frequency cepstrum coefficient (MFCC: Mel Frequency Cepstrum Coefficient) and generates an audio fingerprint from the time differences.

A sound processing system in non-patent document 2 cuts out frames of 370 ms which overlap while shifting for 11.6 ms. And the sound processing system generates an audio fingerprint expressed in 32 dimensions by discrete Fourier transform (DFT: Discrete Fourier Transform), logarithm processing and time and frequency differences for subband divided average power.

A sound processing system in non-patent document 3 cuts out frames of 370 ms which overlap while shifting for 11.6 ms. And the sound processing system generates an audio fingerprint expressed in 32 dimensions by discrete wavelet (Wavelet) transform, frequency differences and time differences.

Also, a sound processing system in patent document 1 cuts out frames of 10-30 ms which overlap, and generates a time—frequency segment via Fourier transform, division by mel scale or Bark scale, and mean value calculation by using a window function. And after two-dimensional DCT (Discrete Cosine Transform) is performed, its lower band is output as a voice characteristic amount.

In the sound processing system in patent document 1, though, for example, the voice characteristic amount of 112 elements is generated, considering processing speed when it is used, 30 elements in the lower band are selected as the voice characteristic amount for voice recognition or speaker recognition.

Also, a sound processing system in patent document 2 performs FFT to frames of 64 ms which overlap 50% and generates characteristic vectors, and for example, obtains a difference for a neighboring band pair of band of M=13 and generates an audio fingerprint encoded on the basis of the difference result.

CITATION LIST

Patent Document

[Patent document 1] Japanese Unexamined Patent Application Publication No. 2003-044077
[Patent document 2] Japanese Unexamined Patent Application Publication No. 2007-065659

Non-Patent Document

[Non-patent document 1] P. Cano, E. Battle, T. Kalker, and J. Haitsma, "A review of algorithms for audio fingerprinting", in International Workshop on Multimedia Signal Processing, December 2002.
[Non-patent document 2] Jaap Haitsma, Ton Klker, "A Highly Robust Audio Fingerprinting System" Proc. ISMIR 2002 3rd International Conference on Music Information Retrieval.
[Non-patent document 3] Yasushi Inoguchi and Vijay K. Jain, "Super speed detection of an audio electronic fingerprint via the internet for proper music circulation", The Telecommunications Advancement Foundation, Research investigation report No. 24 2009, pp. 604-615.

SUMMARY OF INVENTION

Technical Problem

However, concerning the sound processing systems in the background art mentioned above, improving temporal accuracy and being robust against mixing with other sounds are not yet enough, and also dimensions of either characteristic amount vector are limited to about 30 dimensions for real-time sound identification and matching of which computational amount is reduced.

Therefore, real-time sound identification and matching which solved both of a problem of reducing time length of a frame and improving temporal accuracy and a problem of being robust against mixing with other sounds at one time could not be accomplished.

The object of the present invention is to provide a technology which solves the problems mentioned above.

Solution to Problem

A sound processing device according to the present invention includes: a time-frequency analysis means which generates a time-frequency plane from a sound signal through time-frequency analysis; a region characteristic amount extraction means which, for a plurality of partial region pairs which is defined on the time-frequency plane and of which at least either of shapes of two partial regions or positions of the two partial regions differ from one another, extracts a region characteristic amount from each partial region; and a sound identifier generation means which generates a sound identifier which identifies the sound by using the region characteristic amount from the each partial region.

A sound processing system according to the present invention includes: the sound processing device described above and a sound matching device which performs matching or identification of a sound by using the sound identifier generated by the sound processing device.

A video processing system according to the present invention includes: the sound processing device described above which generates a sound identifier from a sound signal included in a video signal and a video matching device which performs matching or identification of a video by using the sound identifier generated by the sound processing device.

A control method of a sound processing device according to the present invention includes: a time-frequency analysis step which generates a time-frequency plane from a sound signal through time-frequency analysis; a region characteristic amount extraction step which, for a plurality of partial region pairs which is defined on the time-frequency plane and of which at least either of shapes of two partial regions or positions of the two partial regions differ from one another, extracts a region characteristic amount from each partial region; and a sound identifier generation step which generates a sound identifier which identifies the sound by using the region characteristic amount from the each partial region.

A control program of a sound processing device according to the present invention makes a computer execute: a time-frequency analysis step which generates a time-frequency plane from a sound signal through time-frequency analysis; a region characteristic amount extraction step which, for a plurality of partial region pairs which is defined on the generated time-frequency plane and of which at least either of shapes of two partial regions or positions of the two partial regions differ from one another, extracts a region characteristic amount from each partial region; and a sound identifier generation step which generates a sound identifier which identifies the sound by using the region characteristic amount from the each partial region extracted by the region characteristic amount extraction means.

A sound processing method according to the present invention is a sound processing method including: a sound processing step which generates a sound identifier which identifies a sound on the basis of time-frequency analysis of a sound signal; and a sound matching step which performs matching of the sound by using the generated sound identifier; wherein the sound processing step includes: a time-frequency analysis step which generates a time-frequency plane from the sound signal through time-frequency analysis; a region characteristic amount extraction step which, for a plurality of partial region pairs which is defined on the generated time-frequency plane and of which at least either of shapes of two partial regions or positions of the two partial regions differ from one another, extracts a region characteristic amount from each partial region; and a sound identifier generation step which generates the sound identifier which identifies the sound by using the region characteristic amount from the extracted each partial region.

A video processing method according to the present invention is a video processing method including: a sound processing step which generates a sound identifier from a sound signal included in a video signal; and a video matching step which performs matching of a video by using the generated sound identifier; wherein the sound processing step includes: a time-frequency analysis step which generates a time-frequency plane from the sound signal through time-frequency analysis; a region characteristic amount extraction step which, for a plurality of partial region pairs which is defined on the generated time-frequency plane and of which at least either of shapes of two partial regions or positions of the two partial regions differ from one another, extracts a region characteristic amount from each partial region; and a sound identifier generation step which generates a sound identifier which identifies the sound by using the region characteristic amount from the each partial region extracted by the region characteristic amount extraction means.

Advantageous Effects of Invention

According to the present invention, by solving both of the problem of reducing time length of a frame and improving temporal accuracy and the problem of being robust against mixing with other sounds, real-time sound identification and matching can be accomplished.

BRIEF DESCRIPTION OF DRAWINGS

FIG. 5 is a block diagram showing a structure of a region characteristic amount extractor according to the second exemplary embodiment of the present invention.

FIG. 6A is a figure showing a structure of an extraction region memory unit according to the second exemplary embodiment of the present invention.

FIG. 6B is a figure showing a specific example of per dimension extraction region information according to the second exemplary embodiment of the present invention.

FIG. 10A is a block diagram showing another structure of a time-frequency analyzer according to the second exemplary embodiment of the present invention.

FIG. 10B is a block diagram showing yet another structure of a time-frequency analyzer according to the second exemplary embodiment of the present invention.

FIG. 10C is a block diagram showing yet another structure of a time-frequency analyzer according to the second exemplary embodiment of the present invention.

FIG. 11 is a figure showing a concept of sound processing according to the third exemplary embodiment of the present invention.

FIG. 17 is a figure showing a structure of a region characteristic amount extraction method memory unit according to the fifth exemplary embodiment of the present invention.

FIG. 20 is a block diagram showing a structure of a sound identifier generator according to the sixth exemplary embodiment of the present invention.

FIG. 21 is a figure showing a structure of a comparison/quantization method memory unit according to the sixth exemplary embodiment of the present invention.

FIG. 25 is a figure showing a structure of a sound identifier generation method memory unit according to the seventh exemplary embodiment of the present invention.

DESCRIPTION OF EMBODIMENTS

In the following, exemplary embodiments of the present invention will be explained exemplarily with reference to drawings. However, components described in the following exemplary embodiments are just exemplification and are not intended to limit technological scopes of the present invention to only those.

[The First Exemplary Embodiment]

Figure 1:
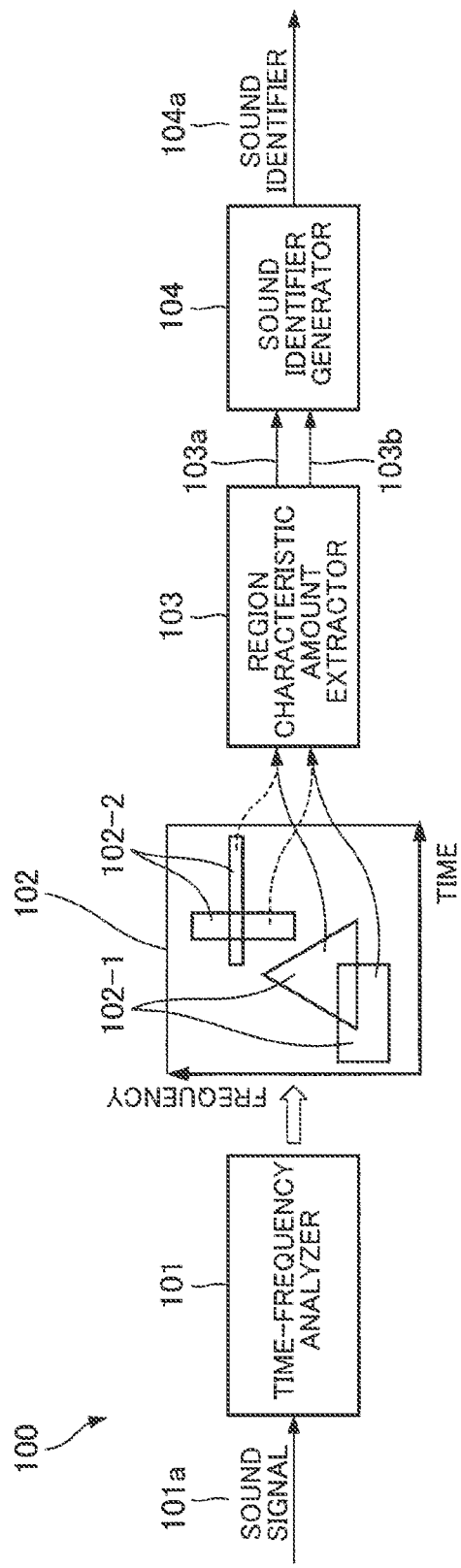
FIG. 1 is a block diagram showing a structure of a sound processing device according to the first exemplary embodiment of the present invention.

FIG. 1 is a block diagram of a sound processing device 100 according to the first exemplary embodiment of the present invention.

The sound processing device 100 is a device which generates a sound identifier 104a which identifies a sound on the basis of time-frequency analysis of a sound signal 101a. As shown in FIG. 1, the sound processing device 100 includes a time-frequency analyzer 101, a region characteristic amount extractor 103 and a sound identifier generator 104.

The time-frequency analyzer 101 generates a time-frequency plane 102 from the sound signal 101a through time-frequency analysis. On the time-frequency plane 102, a plurality of partial region pairs 102-1 and 102-2 of which at least either of shapes of two partial regions or positions of the two partial regions differ from one another is defined.

The region characteristic amount extractor 103 extracts, for a plurality of the partial region pairs 102-1 and 102-2, region characteristic amounts 103a and 103b from the each partial region.

The sound identifier generator 104 generates the sound identifier 104a which identifies the sound by using the region characteristic amounts 103a and 103b from the each partial region which the region characteristic amount extractor 103 extracted.

The sound processing device of this exemplary embodiment can perform real-time sound identification which solves both of the problem of reducing time length of a frame and improving temporal accuracy and the problem of being robust against mixing with other sounds.

[The Second Exemplary Embodiment]

Next, a sound processing device according to the second exemplary embodiment of the present invention will be explained.

The sound processing device according to this exemplary embodiment extracts, on a time-frequency plane obtained from a sound signal through time-frequency analysis, a region characteristic amount of each partial region of a partial region pair including two partial regions. And a result of compared sizes of the region characteristic amounts is quantized.

For example, suppose quantization is of three values and dimensions are 300 dimensions which are enough as precision of a sound identifier. 300 dimensions are generated by changing combination of shapes and positions of the partial regions in the partial region pair on the time-frequency plane. In this case, they are expressed in 600 bits (=2 bits (three values)×300), and a sound identifier of 75 bytes is generated.

Additionally, the sound processing device in the second exemplary embodiment generates successive series of time-frequency planes and generates a series of sound identifiers. As a result, further precise sound identifier is obtained.

According to this exemplary embodiment, memory capacity can be kept small due to little information and the sound identifier can be generated in real time. Therefore, sound identification and sound matching for which comparison processing of the sound identifiers is necessary can be realized in real time.

<<Concept of Sound Processing>>

Figure 2:
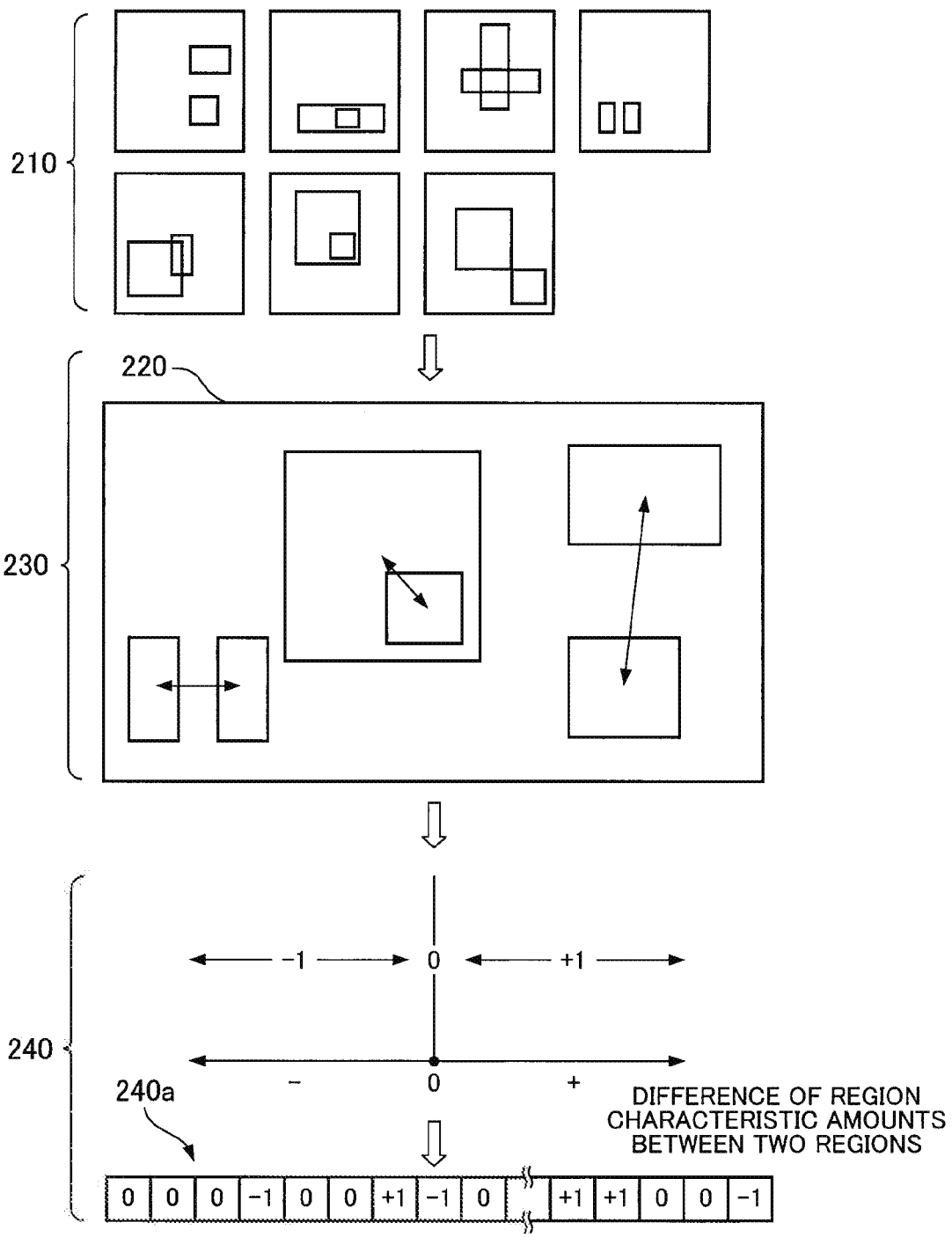
FIG. 2 is a figure showing a concept of sound processing according to the second exemplary embodiment of the present invention.

FIG. 2 is a figure showing a processing concept of a sound processing device 200 (FIG. 3) according to this exemplary embodiment.

Further, since various methods are known for generation of the time-frequency plane, processing after the time-frequency plane generation will be shown in FIG. 2.

First processing 210 of FIG. 2 shows a state in which a plurality of time-frequency planes is generated by performing time-frequency analysis to the sound signal, and a plurality of partial region pairs is generated. Inside each of the time-frequency planes, the partial region pair is defined.

Each partial region pair includes at least either one of a difference in positional relationship including a difference in relative positional relationship between the partial regions or a difference in absolute positions and a difference in shapes of the partial regions.

Second processing 230 of FIG. 2 shows a state in which a region characteristic amount is extracted from each partial region. In same time-frequency plane 220, relationship between the respective partial regions of the partial region pair and obtaining a difference between the partial regions is expressed.

The way the two partial regions of the partial region pair are defined in the time-frequency plane 220, representative values or mean values of power spectrum included in the respective partial regions are calculated, and their differences are calculated, is shown as arrows which connect centers of the each partial region.

Third processing 240 of FIG. 2 shows the way the calculated difference is quantum coded.

In the third processing 240, when the difference which subtracted a second region characteristic amount from a first region characteristic amount is difference "0" (corresponds to a case when the power spectra are equal), "0" is generated for an output value of the quantum coding. When the difference is a positive (+) value, "+1" is generated for the output value of the quantum coding. When the difference is a negative (−) value, "−1" is generated for the output value of the quantum coding.

The reason to code it into a quantized value of three values of "−1", "0", "+1" in this way is, by make it multidimensional as much as possible, to make separation of the sound characteristic amount easier, and at the same time, to reduce amount of calculation for matching of the sound characteristic amounts.

Accordingly, this exemplary embodiment needs not be limited to the example of three values mentioned above, and may also be a structure of binarization. In this way, a sound identifier element which becomes an element of the sound identifier is generated. This sound identifier element generation is repeated by a number of dimensions (number of the partial region pairs).

240a of FIG. 2 shows an example of the sound characteristic amount generated by putting together results of the quantum coding of the differences. The sound characteristic amount 240a is, as an easy example, data which placed values which are the differences being quantum coded in order of dimension in a one-dimensional direction.

For example, in case of 300 dimensions, it is expressed in 600 bits (=2 bits (three values)×300), and the sound identifier of 75 bytes is generated. Further, a volume identifier may not simply be data which placed values which are the differences being quantum coded in order of dimension in a one-dimensional direction, but may also be one in which they are placed in a multidimensional direction or data to which further additional operations are added, and is not limited to this example.

<<Functional Structure of the Sound Processing Device>>

Figure 3:
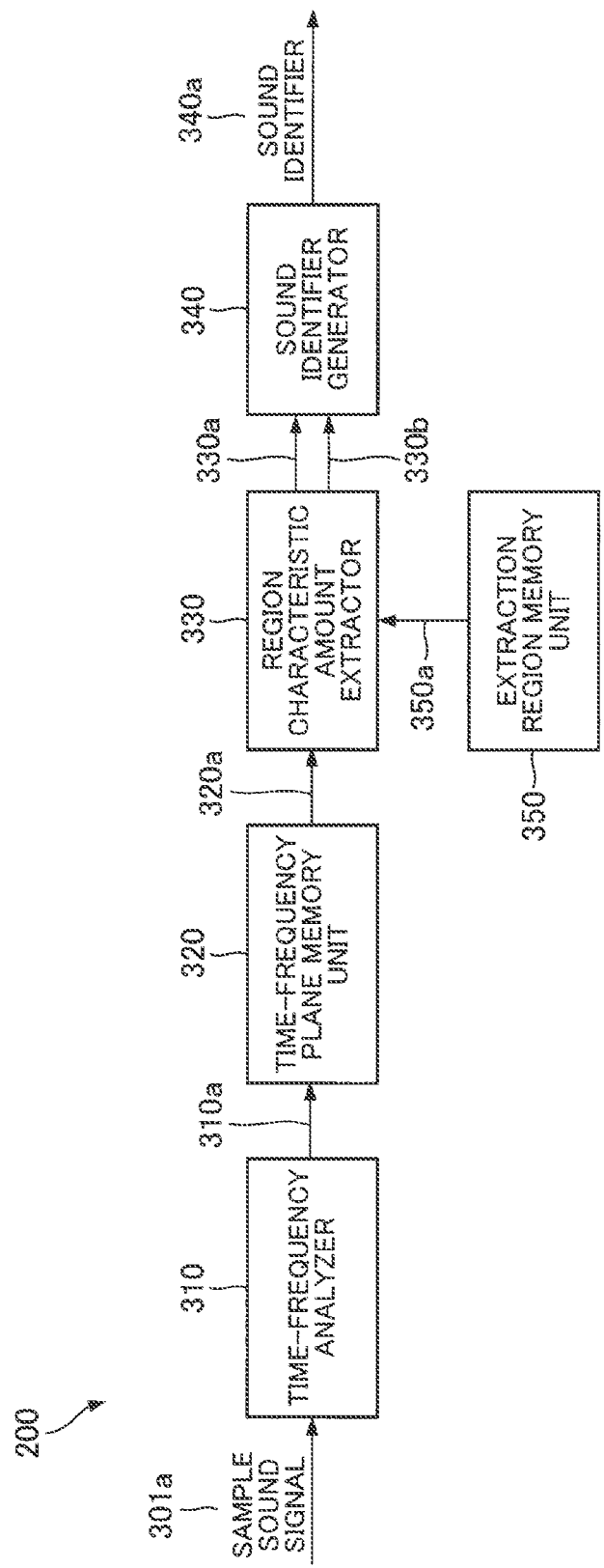
FIG. 3 is a block diagram showing a functional structure of a sound processing device according to the second exemplary embodiment of the present invention.

FIG. 3 is a block diagram showing a functional structure of the sound processing device 200 according to this exemplary embodiment.

A time-frequency analyzer 310 analyzes an inputted sample sound signal 301a and outputs time-frequency data 310a. The time-frequency data 310a is a power spectrum positioned on a plane of a time axis and a frequency axis.

Here, it is desirable that a sampling period of the sample sound signal 301a can be adjusted according to the inputted sound. For example, if it is a voice reproduced from a CD (Compact Disk), it is desirable to take a sample with sampling frequency of 44.1 kHz. Also, if it is a voice reproduced from a DVD (Digital Versatile Disk), it is desirable to take a sample with sampling frequency of 48 kHz.

As the sampling period becomes shorter, there is an advantage that reproducibility of an instantaneous sound becomes better and a noise becomes less, it is desirable to make the sampling frequency high. Thus, on the basis of characteristic of the inputted sound, for example, classification of a memory medium or characteristic of a reproduction device, appropriate sampling frequency (sampling period) is selected.

A time-frequency plane memory unit 320 arranges the time-frequency data 310a in which time and frequency are discretized on the time-frequency plane by placing them in order of time on the time axis.

A region characteristic amount extractor 330 reads out per dimension extraction region information 350a which shows a partial region pair in sequence according to a number of dimensions from a partial region pair which are memorized in an extraction region memory unit 350 and includes two partial regions.

And the region characteristic amount extractor 330 reads out a power spectrum 320a in each partial region of the partial region pair from the time-frequency plane memory unit 320, performs a predetermined operation, extracts a first region characteristic amount 330a from a first partial region and extracts a second region characteristic amount 330b from a second partial region. As for the predetermined operation here, it is chosen from such as an average, maximum value, a median value and a mode value of the power spectrum in the partial region.

A sound identifier generator 340 performs quantization into three values on the basis of size relationship through comparison of the first region characteristic amount 330a and the second region characteristic amount 330b, and generates a sound identifier 340a by combining the result for a number of dimensions (corresponds to the number of the partial region pairs).

(Time-Frequency Analyzer)

Figure 4:
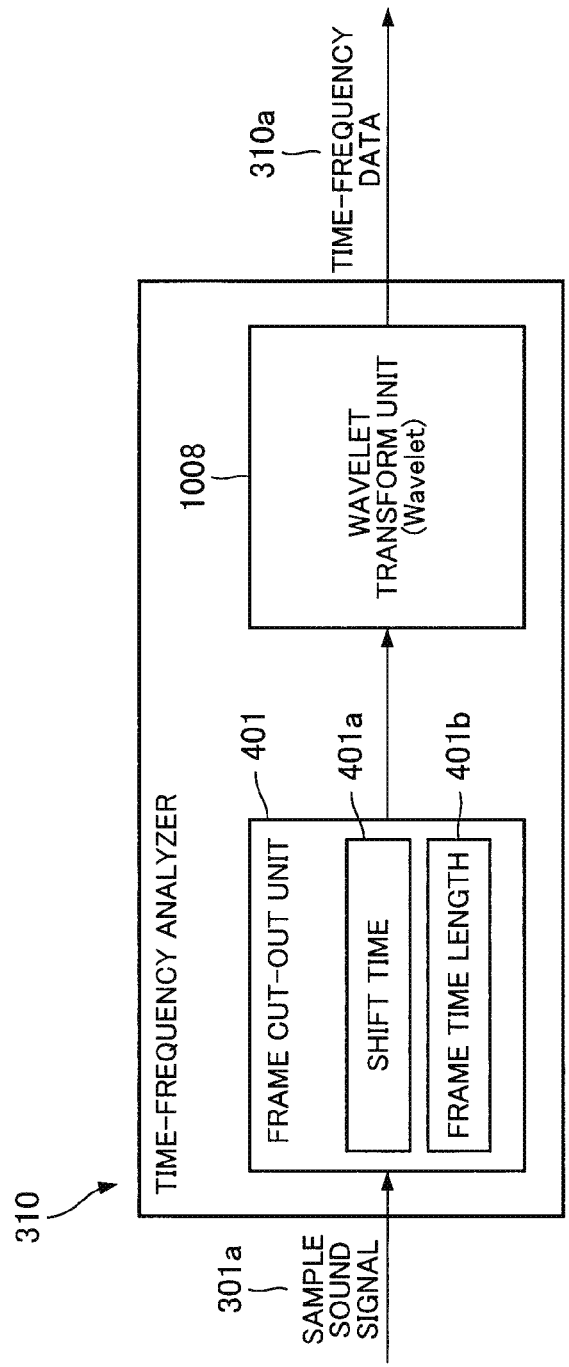
FIG. 4 is a block diagram showing a structure of a time-frequency analyzer according to the second exemplary embodiment of the present invention.

FIG. 4 is a block diagram showing a structure of the time-frequency analyzer 310 according to this exemplary embodiment.

The time-frequency analyzer 310 includes a frame cut-out unit 401 and a wavelet transform unit 402. The frame cut-out unit 401 cuts out a frame having a predetermined time length from the sample sound signal 301a while shifting with a predetermined time. The frame cut-out unit 401 memorizes a shift time 401a and a frame time length 401b used.

As for the shift time 401a, about 10 ms which is often used in this technical field, in particular, 11.6 ms, is used. As for the shift time between the frames, a range of 5 ms-15 ms is desirable. Also, as for the frame time length 401b, for example, about 30 ms is used. Further, there is no limit for the frame time length.

In this exemplary embodiment, as the frame time length, a range is made 30 ms—several seconds. This frame time length is necessary in order not to decrease amount of information of all frequency regions. However, there is a case when delay of processing may occur due to the frame time length and real-time processing may become difficult.

Therefore, in case the frame time length is long, it is possible not to make the sampling period fixed, but, for example, to make the period at a start time short and to make sampling sparse appropriately so as the period becomes longer gradually. As a result, while maintaining reproducibility of an instantaneous sound around the start time, reproducibility of a low frequency can be improved.

The wavelet transform unit 402 performs wavelet transform to the sample sound signal in each frame. And the wavelet transform unit 402 outputs the time-frequency data 310a which is a power spectrum on the time-frequency plane. By placing the time-frequency data 310a on the time axis, the time-frequency plane is generated.

Further, since the wavelet transform is well known as described as a part of the processing of non-patent document 3, it is not explained in detail here.

(Region Characteristic Amount Extractor)

FIG. 5 is a block diagram showing a structure of the region characteristic amount extractor 330 according to this exemplary embodiment.

The region characteristic amount extractor 330 includes a dimension decision unit 501, an extraction region acquisition unit 502 and a region characteristic amount extractor 503. The region characteristic amount extractor 503 includes a first region characteristic amount extractor 503A which extracts a characteristic amount of a first extraction region of the partial region pair and a second region characteristic amount extractor 503B which extracts a characteristic amount of a second extraction region.

The dimension decision unit 501 determines dimensions for which a region characteristic amount is extracted in the region characteristic amount extractor 330 by using the partial region pair.

Further, as for the dimensions of the dimension decision unit 501, a structure which memorizes the dimensions decided in advance in a memory unit may also be fine. Also, a structure in which an operator defines them corresponding to such as classification of a target sound, or a structure in which the sound processing device 200 defines them by determines such as classification of the target sound may also be fine (not illustrated).

The extraction region acquisition unit 502 acquires a number of the dimensions from the dimension decision unit 501 and acquires the per dimension extraction region information 350a which is information of the partial region pair from the extraction region memory unit 350. And each partial region of the partial region pair is outputted as first extraction region information and second extraction region information. Hereinafter, a standard of size or difference in the sound identifier generator 340 (in case of difference, side which is subtracted) is made the first region.

The first region characteristic amount extractor 503A of the region characteristic amount extractor 503 takes out a power spectrum in the first extraction region from the power spectrum 320a read out from the time-frequency plane memory unit 320, and extracts the first region characteristic amount 330a. Further, as operation methods for characteristic amount extraction, although there exists a variety such as a mean value and a maximum value (refer to FIG. 17), in this exemplary embodiment, a case when a mean value is made a characteristic amount will be explained.

The second region characteristic amount extractor 503B takes out a power spectrum in the second extraction region from the power spectrum 320a read out from the time-frequency plane memory unit 320, and extracts the second region characteristic amount 330b. Further, the operation method for characteristic amount extraction of the first region and the second region may be usually the same, however, different operation methods may also be combined.

(Extraction Region Memory Unit)

FIG. 6A is a figure showing a structure of the extraction region memory unit 350 according to this exemplary embodiment.

The extraction region memory unit 350 of FIG. 6A, memorizes four coordinates as first extraction region information 602 and memorizes four coordinates as second extraction region information 603 by correlating them to each dimension (first dimension, second dimension, ..., n-th dimension) 601.

Further, although FIG. 6A shows information of a rectangle in which each extraction region is expressed by four coordinates, information of the extraction region which is a partial region is not limited to the four coordinates. For example, if an extraction region shape is a square, the extraction region memory unit 350 may memorize two coordinates of opposite angles. Also, if the shape is an extraction region with a complicated shape, no smaller than four characteristic points may be memorized. Further, in case the shape is a curve line, the extraction region memory unit 350 may memorize such as a focus and a radius or a parameter of a spline curve.

FIG. 6B is a figure showing a specific example of the per dimension extraction region information 350a according to this exemplary embodiment.

FIG. 6B is a figure showing twelve kinds of partial region pairs corresponding to 12 dimensions. As shown in FIG. 6B, it is desirable to decide shapes and positions of each partial region of the partial region pairs so that the partial region pairs on the time-frequency plane may include effective information for identification of the sound which is targeted.

Also, not a decision is made in one partial region pair, but considering relation with other partial region pairs comprehensively, the extraction regions may be decided. For example, according to the classification of the sound, it may be modified so that one which characterizes an order of the partial region pair of each dimension may also be placed in front.

(Sound Identifier Generator)

Figure 7:
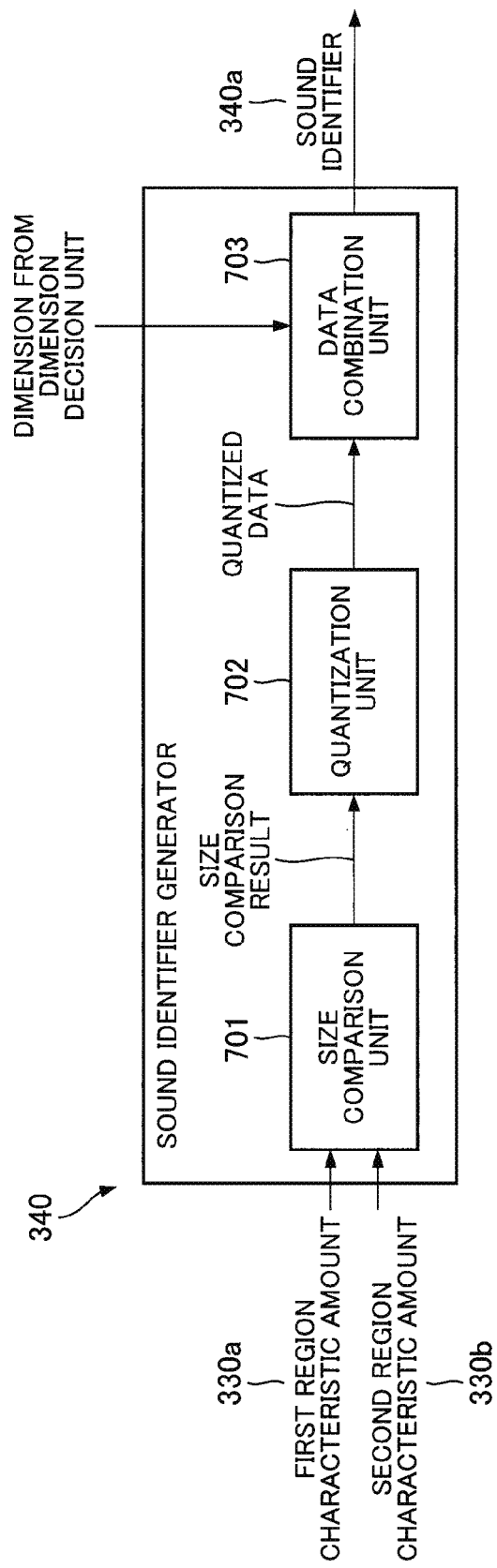
FIG. 7 is a block diagram showing a structure of a sound identifier generator according to the second exemplary embodiment of the present invention.

FIG. 7 is a block diagram showing a structure of the sound identifier generator 340 according to this exemplary embodiment.

The sound identifier generator 340 of this exemplary embodiment includes a size comparison unit 701, a quantization unit 702 and a data combination unit 703.

The size comparison unit 701 inputs the first region characteristic amount 330a and the second region characteristic amount 330b outputted from the region characteristic amount extractor 330, compares sizes, and outputs the size comparison result. In this exemplary embodiment, as mentioned above, information which shows whether the second region characteristic amount 330b is larger than/equal to/smaller than the first region characteristic amount 330a is outputted.

The quantization unit 702 outputs, from the size comparison result and when the second region characteristic amount is larger than the first region characteristic amount, "1" as a quantized data. Also, when the second region characteristic amount is equal to the first region characteristic amount, the quantization unit 702 outputs "0" as the quantized data. Also, when the second region characteristic amount is smaller than the first region characteristic amount, the quantization unit 702 outputs "−1" as the quantized data.

Quantization of so-called ternarization is performed (refer to the third processing 240 of FIG. 2). Such ternarization is in order to aim for speedup of data processing with a little number of bits (2 bits) and at the same time, to secure amount of information for improving accuracy.

The data combination unit 703 combines the quantized data of three values outputted from the quantization unit 702 for the number of dimensions from the dimension decision unit 501, and outputs the sound identifier 340a of the target sound.

Further, combination methods may place the quantized data of three values for the number of dimensions simply in order of output, or may put together the quantized data which are judged to be more characteristic (difference point is larger). Also, in case the generated sound identifier is stored, "0" may be put together according to the coding.

Or, instead of not simply putting together the quantized data, certain numerical operation or logical operation may be performed.

<<Hardware Structure of the Sound Processing Device>>

Figure 8:
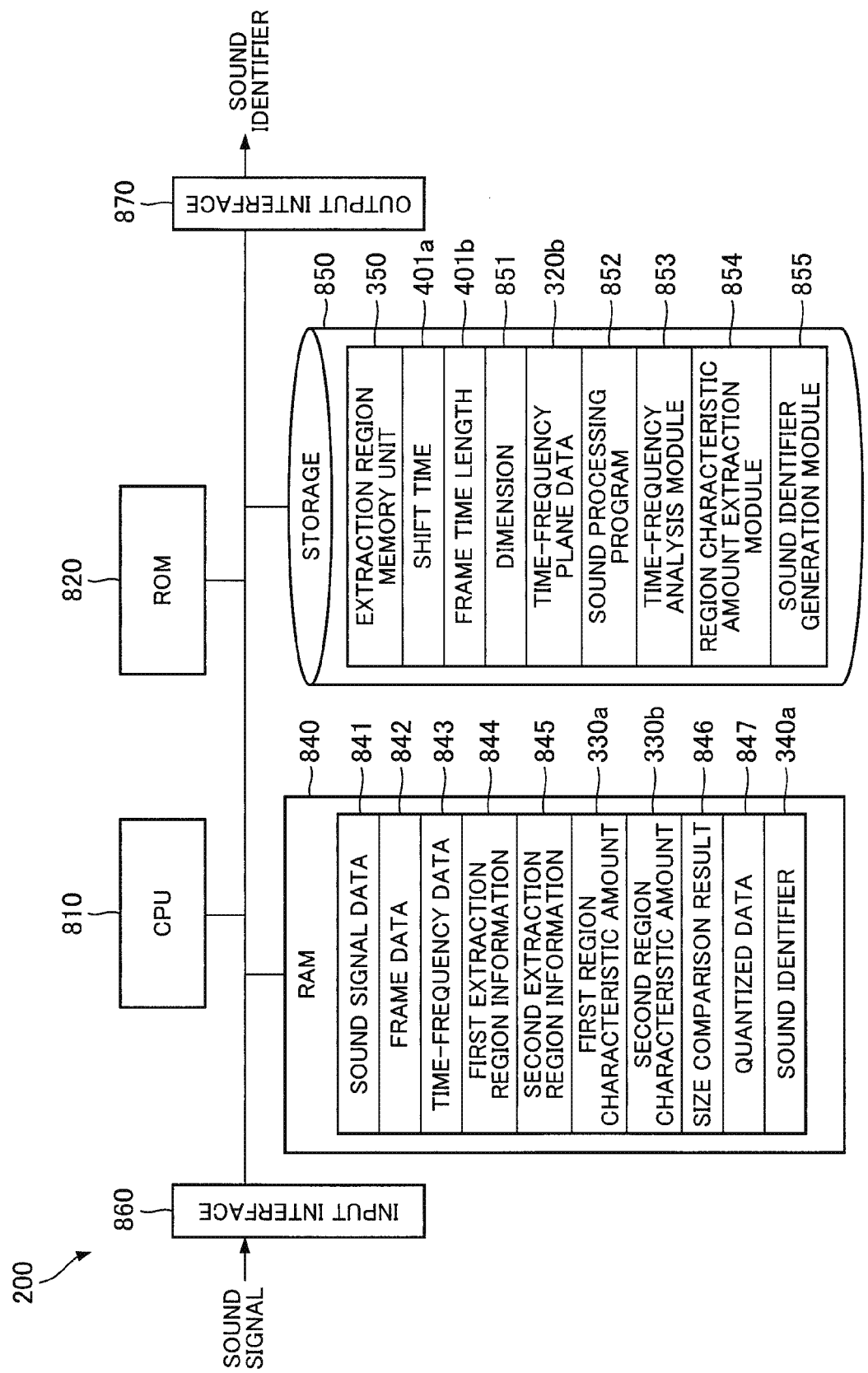
FIG. 8 is a block diagram showing a hardware structure of a sound processing device according to the second exemplary embodiment of the present invention.

FIG. 8 is a block diagram showing a hardware structure of the sound processing device 200 according to this exemplary embodiment.

In FIG. 8, CPU 810 is a processor for operation control and realizes each functional structure unit of FIG. 3 by executing a program. ROM 820 memorizes initial data, fixed data of such as a program and a program. Further, in case the sound processing device 200 is connected to a network and sends and receives data via the network or is operated, a communication control unit is included (not illustrated).

RAM 840 is a random access memory which the CPU 810 uses as a work area of temporary memory. In the RAM 840, an area which memorizes data necessary to realize this exemplary embodiment is reserved.

The RAM 840 memorizes: a sound signal data 841 which is sampled and inputted, a frame data 842 cut out from the sound signal according to the shift time 401$a$ and the frame time length 401$b$, a time-frequency data 843 which is generated from each frame data 842, first extraction region information 844 of a partial region pair of one certain dimension, second extraction region information 845 of a partial region pair of one certain dimension, the first region characteristic amount 330$a$ of the first extraction region, a size comparison result 846 of the first region characteristic amount 330$a$ and the second region characteristic amount 330$b$, a quantized data 847 which is ternarized from the size comparison result 846, and the sound identifier 340 which combined the quantized data 847 which is ternarized for the number of dimensions.

A storage 850 stores database and various parameters or data or program necessary to realize this exemplary embodiment.

More specifically, the storage 850 memorizes: the extraction region memory unit 350 (refer to FIG. 6A and FIG. 6B), the shift time 401$a$ between the frames, the frame time length 401$b$ of each frame, a dimension 851 of the dimension decision unit 501 and the time-frequency plane data 320$b$ generated from a plurality of frames.

Also, the storage 850 memorizes a sound processing program 852 which makes processing of the whole body to be executed. In the sound processing program 852, a time-frequency analysis module 853 which performs time-frequency analysis, a region characteristic amount extraction module 854 which extracts a region characteristic amount of each dimension and a sound identifier generation module 855 which generates the sound identifier by putting together the region characteristic amounts for the number of dimensions are included.

An input interface 860 is an interface which inputs the sound signal as digital data. Also, an output interface is an interface which outputs the generated sound identifier.

Further, in FIG. 8, general-purpose data and program such as OS are not shown.

<<Operation Procedure of the Sound Processing Device>>

Figure 9:
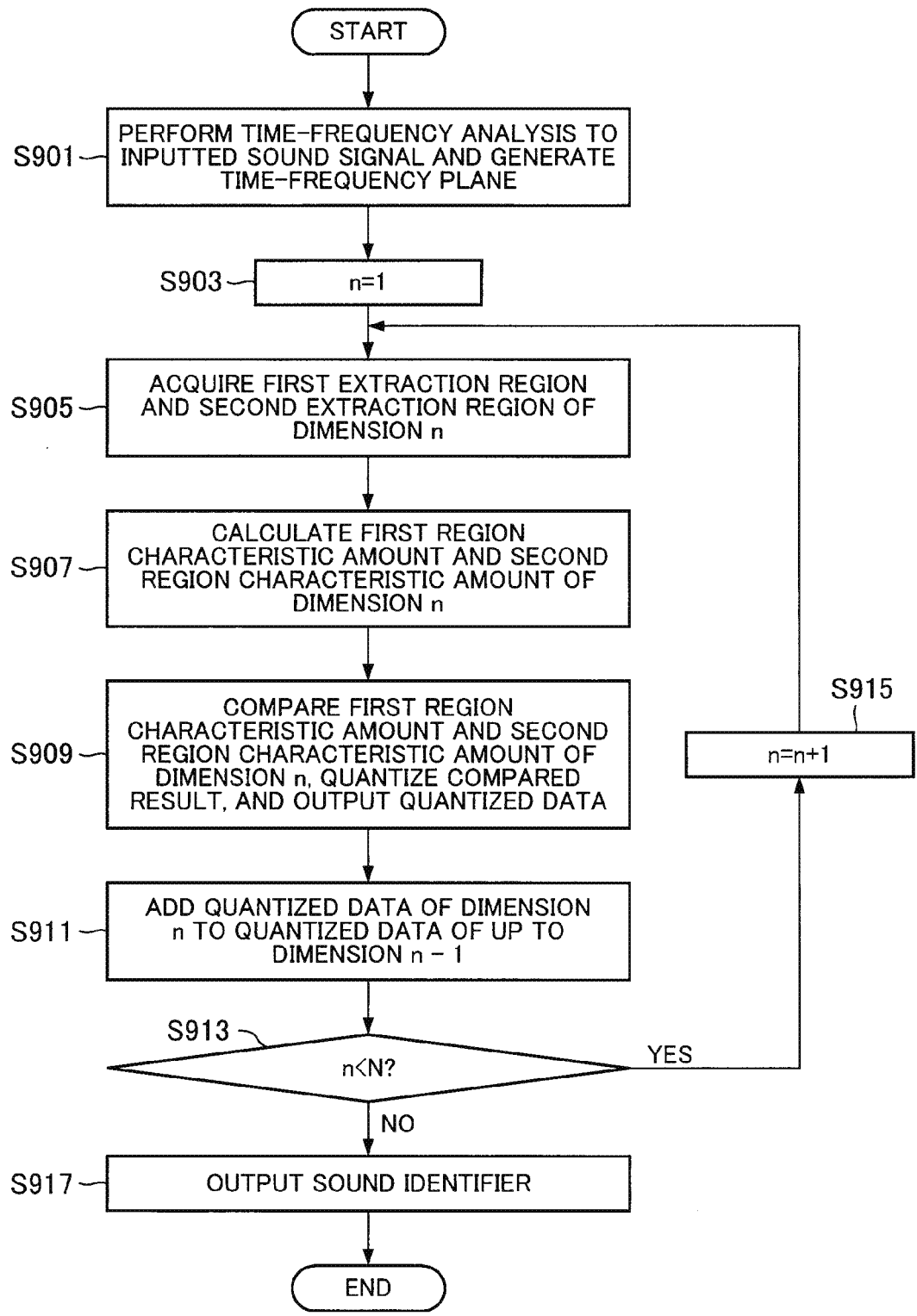
FIG. 9 is a flow chart showing an operation procedure of a sound processing device according to the second exemplary embodiment of the present invention.

FIG. 9 is a flow chart showing an operation procedure of the sound processing device according to this exemplary embodiment. The CPU 810 of FIG. 8 executes this flow chart by using the RAM 840. Each functional structure unit of FIGS. 3-5 and FIG. 7 executes this flow chart by the CPU 810.

First, in Step S901, the time-frequency analyzer 310 performs time-frequency analysis to the inputted sound signal and generates the time-frequency plane. In Step S903, the dimension decision unit 501 of the region characteristic amount extractor 330 initializes to 1 a parameter n for loops in which following Steps S905-S915 loop for each dimension.

In the loop for each dimension, in Step S905, the extraction region acquisition unit 502 of the region characteristic amount extractor 330 acquires a partial region pair of a first extraction region and a second extraction region of the dimension n.

In Step S907, the region characteristic amount extractor 503 of the region characteristic amount extractor 330 calculates a first region characteristic amount and a second region characteristic amount of the dimension n. And in Step S909, the size comparison unit 701 of the sound identifier generator 340 compares the first region characteristic amount and the second region characteristic amount of the dimension n, and the quantization unit 702 of the sound identifier generator 340 quantizes the comparison result into three values and outputs the quantized data. In Step S911, the data combination unit 703 of the sound identifier generator 340 adds the quantized data of the dimension n to the quantized data of up to the dimension n−1. In Step S913, the sound identifier generator 340 judges whether the calculation of the quantized data up to a decided N dimension is completed. When the calculation of the quantized data is not completed, processing proceeds to Step S915, adds +1 to the parameter n for loops (in FIG. 9, n=n+1), and returns to Step S905.

On the other hand, when the calculation of the quantized data is completed, processing proceeds to Step S917, and the sound identifier generator 340 outputs the generated sound identifier.

(Another Structure of the Time-Frequency Analyzer)

FIG. 10A is a block diagram showing a time-frequency analyzer 1010-1 of another structure of the time-frequency analyzer according to this exemplary embodiment.

The time-frequency analyzer 1010-1 includes the frame cut-out unit 401, a fast Fourier transform (hereinafter, shown as FFT) unit 1002, a mel scale (hereinafter, shown as log) processing unit 1003 and a discrete cosine transform (hereinafter, shown as DCT) unit 1004. As for the frame cut-out unit 401, although selection of the shift time and the frame time length exists, since basic operation is similar to FIG. 4, its explanation will be omitted.

The FFT unit 1002 analyzes a frequency component of the sound signal in the cut out frame. The log processing unit 1003 executes processing which calculates a logarithm of an integral value in which a window (mel scale) of a plurality of frequency regions is multiplied to an absolute value of the frequency component. The DCT unit 1004 executes, for the output of the log processing unit 1003, processing which puts together spectral information to a lower band. A mel frequency cepstrum coefficient (hereinafter, shown as MFCC) which takes out 12-16 dimensions in the lower dimensions of the output of the DCT 1004 is used as a time-frequency data 1010-1$a$ which is arranged in order of time on the time-frequency plane of this exemplary embodiment.

Such time-frequency analysis can use the similar structure as the structure shown in non-patent document 1 (please refer to non-patent document 1 for a detailed explanation of the processing).

(Yet Another Structure of the Time-Frequency Analyzer)

FIG. 10B is a block diagram which shows a time-frequency analyzer 1010-2 of yet another structure in the time-frequency analyzer according to this exemplary embodiment. Such time-frequency analysis can use the similar structure as the structure shown in non-patent document 2 (please refer to non-patent document 2 for its detailed explanation of the processing).

The time-frequency analyzer 1010-2 includes the frame cut-out unit 401, a discrete Fourier transform (hereinafter, shown as DFT) unit 1006, a mel scale (log) processing unit 1007 and a subband division unit 1008. As for the frame cut-out unit 401, although selection of the shift time and the frame time length exists, since basic operation is similar to FIG. 4, its explanation will be omitted.

The DFT unit 1006 analyzes a discrete frequency component of the sound signal in the cut out frame. The log processing unit 1007 executes processing which calculates a logarithm of an integral value in which a window (mel scale) of a plurality of frequency regions is multiplied to an absolute value of the frequency component.

The subband division unit 1008 divides the output of the log processing unit 1007 into band widths of 33 and calculates an average power. The output of the subband division 1008 is a time-frequency data 1010-2$a$ which is arranged in order of time on the time-frequency plane of this exemplary embodiment.

(Yet Another Structure of the Time-Frequency Analyzer)

FIG. 10C is a block diagram which shows a time-frequency analyzer 1010-3 of yet another structure of the time-frequency analyzer according to this exemplary embodiment. Such time-frequency analysis can use the structure described in the following non-patent document 4 (for detailed explanation, please refer to the following document).

Masataka Goto, "A Chorus Section Detection Method for Musical Audio Signals and Its Application to a Music Listening Station", IEEE TRANSACTIONS ON AUDIO, SPEECH, AND LANGUAGE PROCESSING, VOL. 14, NO. 5, SEPTEMBER 2006 1783.

The time-frequency analyzer 1010-3 includes the frame cut-out unit 401, the fast Fourier transform (FFT) unit 1002 or the discrete Fourier transform (DFT) unit 1006 and a chroma vector (chroma vector) calculation unit 1009. As for the frame cut-out unit 401, although selection of the shift time and the frame time length exists, since basic operation is similar to FIG. 4, its explanation will be omitted.

The FFT 1002 or the DFT 1006 analyzes a frequency component of the sound signal in the cut out frame. The chroma vector calculation unit 1009 calculates a chroma vector which is a characteristic amount which expressed distribution of the power with a chroma (pitch name: chroma) as a frequency axis. The output of the chroma vector calculation unit 1009 is used as a time-frequency data 1010-3$a$ which is arranged in order of time on the time-frequency plane of this exemplary embodiment.

Further, in this exemplary embodiment, although parts of the procedures which are being used respectively in non-patent documents 1-3 are applied in generating the time-frequency plane, they are not limited to those.

In general, frames which overlap are cut out from the sound signal while shifting, and frequency analysis is performed and frequency distribution of the power spectrum is calculated. And it is well known that, by defining a plurality of window functions or interval functions which select different frequency widths and calculating an average power, a time-frequency plane can be generated.

The processing mentioned above such as FFT (Fast Fourier Transform), DFT (Discrete Fourier Transform), DCT (Discrete Cosine Transform), MCLT (Modulated Complex Transform), Haar Transform, Walsh-Hadamard Transform, Wavelet Transform, log and chroma vector calculation is a part of the specific examples.

[The Third Exemplary Embodiment]

Next, a sound processing device according to the third exemplary embodiment of the present invention will be explained The sound processing device according to this exemplary embodiment is, compared with the second exemplary embodiment mentioned above in which a case when the first region characteristic amount and the second region characteristic amount are equal is quantized to "0", different in a point that a range of difference which is quantized to "0" in the quantization into three values is defined. That is, in case the difference between the first region characteristic amount and the second region characteristic amount is within a predetermined range, the sound processing device regards it as having no characteristics, and quantizes it to "0". Since other structures and operations are similar to those of the second exemplary embodiment, the same structures and operations are attached the same codes and their detailed explanation will be omitted.

According to this exemplary embodiment, by separating a partial region pair with characteristics and a partial region pair with little characteristics, it is possible to remove redundancy as well as to reduce the amount of information and to improve accuracy of the sound identifier.

<<Concept of Sound Processing>>

FIG. 11 is a figure showing a concept of sound processing according to this exemplary embodiment.

Further, since various methods are known for generation of the time-frequency plane, FIG. 11 shows processing after generation of the time-frequency plane. And since the first processing 210, the time-frequency plane 220 and the second processing 230 of FIG. 11 are similar to FIG. 2 of the second exemplary embodiment, their explanation will be omitted.

Fourth processing 1140 of FIG. 11 shows the way the calculated difference is quantum coded.

In the fourth processing 1140, when the difference which subtracted the second region characteristic amount from the first region characteristic amount is between the difference of "$+\alpha$" and "$-\beta$" (which corresponds to an interval between dashed lines 1141$a$ and 1141$b$ of FIG. 11), "0" is generated for an output value of the quantum coding. When the same difference is a value larger than $+\alpha$, "+1" is generated for the output value of the quantum coding. When the same difference is a value smaller than $-\beta$, "−1" is generated for the output value of the quantum coding.

Here, as for the values of "$\alpha$" and "$\beta$", appropriate values are different depending on classification of the sound which is targeted. For example, different values may be defined depending on whether it music or voice. In particular, in case a decided musical instrument or a decided sound is matched, it is desirable to define the most appropriate values.

A sound characteristic amount 1140$a$ is, as an easy example, one which placed values which are the differences being quantum coded in order of dimension in a one-dimensional direction. For example, in case of 300 dimensions, it is expressed in 600 bits (=2 bits (three values)×300), and the sound identifier of 75 bytes is generated.

Further, it may not be one which simply placed values which are the differences being quantum coded in order of dimension in a one-dimensional direction, but may also be one in which they are placed in a multidimensional direction or one to which further additional operations are added, and is not limited to this example.

(Sound Identifier Generator)

Figure 12:
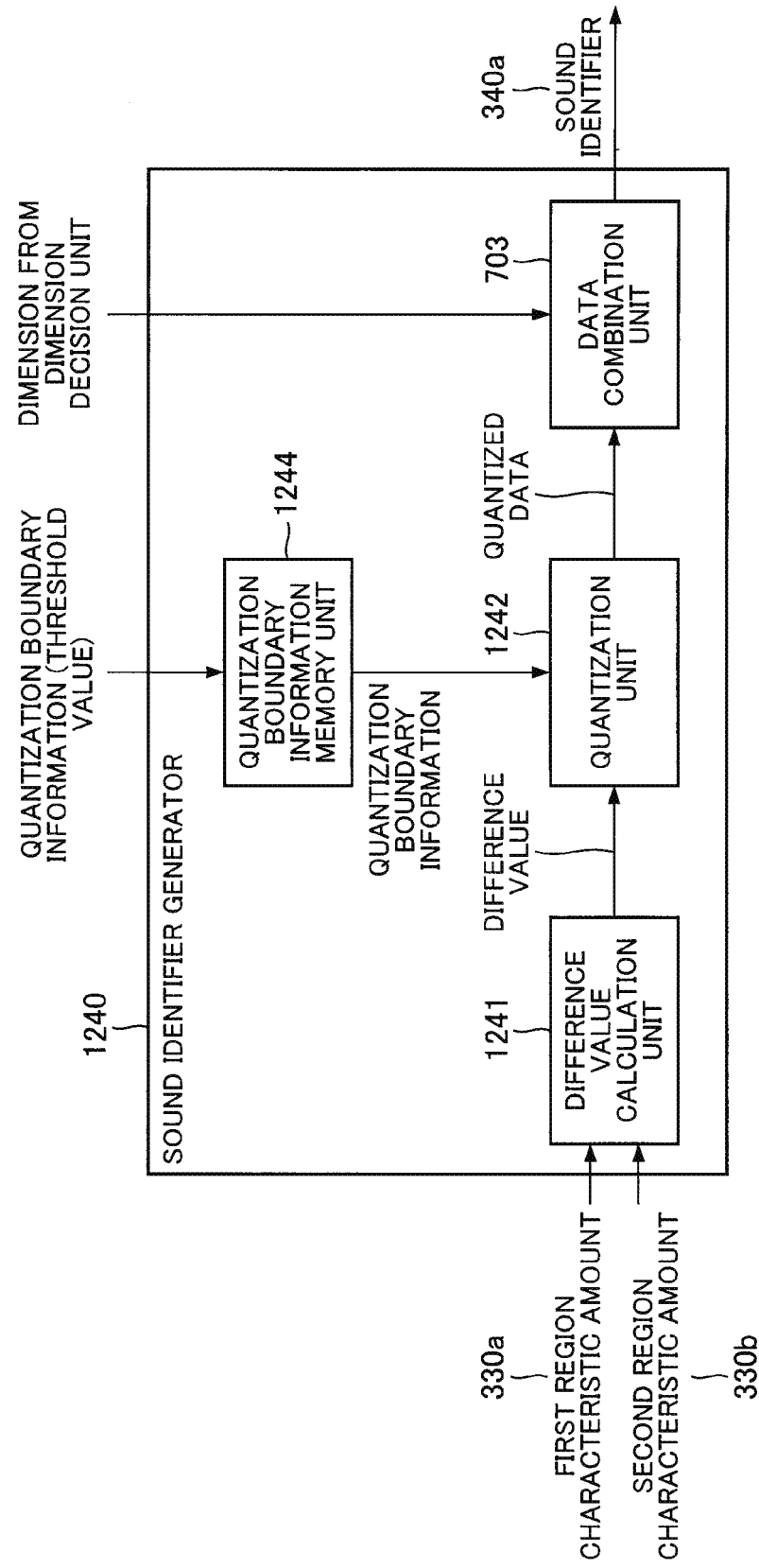
FIG. 12 is a block diagram showing a structure of a sound identifier generator according to the third exemplary embodiment of the present invention.

FIG. 12 is a block diagram showing a structure of a sound identifier generator 1240 according this exemplary embodiment.

The sound identifier generator 1240 includes a difference value calculation unit 1241, a quantization unit 1242, a quantization boundary information memory unit 1244 and the data combination unit 703. Further, since the function of the data combination unit 703 is similar to FIG. 7 of the second exemplary embodiment, its explanation will be omitted.

The difference value calculation unit 1241 calculates the difference between the first region characteristic amount 330a and the second region characteristic amount 330b outputted from the region characteristic amount extractor 330. In this example, it is a signed difference=(the second region characteristic amount−the first region characteristic amount).

The quantization boundary information memory unit 1244 memorizes quantization boundary information which is a threshold value of quantization into three values defined in advance. Further, the quantization boundary information may be "+α" and "−β" of which numerical values are different in plus and minus as shown in FIG. 11, or may also be the same numerical value. Also, the quantization boundary information memory unit 1244 may be a hardware structure such as a switch or may also be a software structure in which an operator inputs from an operation unit.

The quantization unit 1242 outputs, on the basis of the signed difference value which is the output of the difference value calculation unit 1241 and the quantization boundary information which is defined by the quantization boundary decision unit 1244, quantized data of three values of "+1", "0" and "−1".

[The Fourth Exemplary Embodiment]

Next, a sound processing device according to the fourth exemplary embodiment of the present invention will be explained.

When the boundary of quantization is fixed like the third exemplary embodiment, a situation arises such that, for a specific sound, a significant value (+1 or −1) is biased to a specific position of the sound identifier (entropy becomes small). Accordingly, a problem occurs that identification capability declines for these sounds.

The sound processing device according to this exemplary embodiment is, compared with the third exemplary embodiment mentioned above, different in a point that the quantization boundary information of quantization into three values can be defined automatically inside the device. In this exemplary embodiment, the quantization boundary information is decided on the basis of the distribution of the difference values of all dimensions. Since other structures and operations are similar to those of the third exemplary embodiment, the same codes are attached to the same structures and operations and their detailed explanation will be omitted.

According to this exemplary embodiment, by the boundary of quantization being calculated adaptively (dynamically) to the sound, it becomes possible to suppress the significant value (+1 or −1) being biased to a specific position of the sound identifier for any sounds. Therefore, the identification capability can be made high.

(Sound Identifier Generator)

Figure 13:
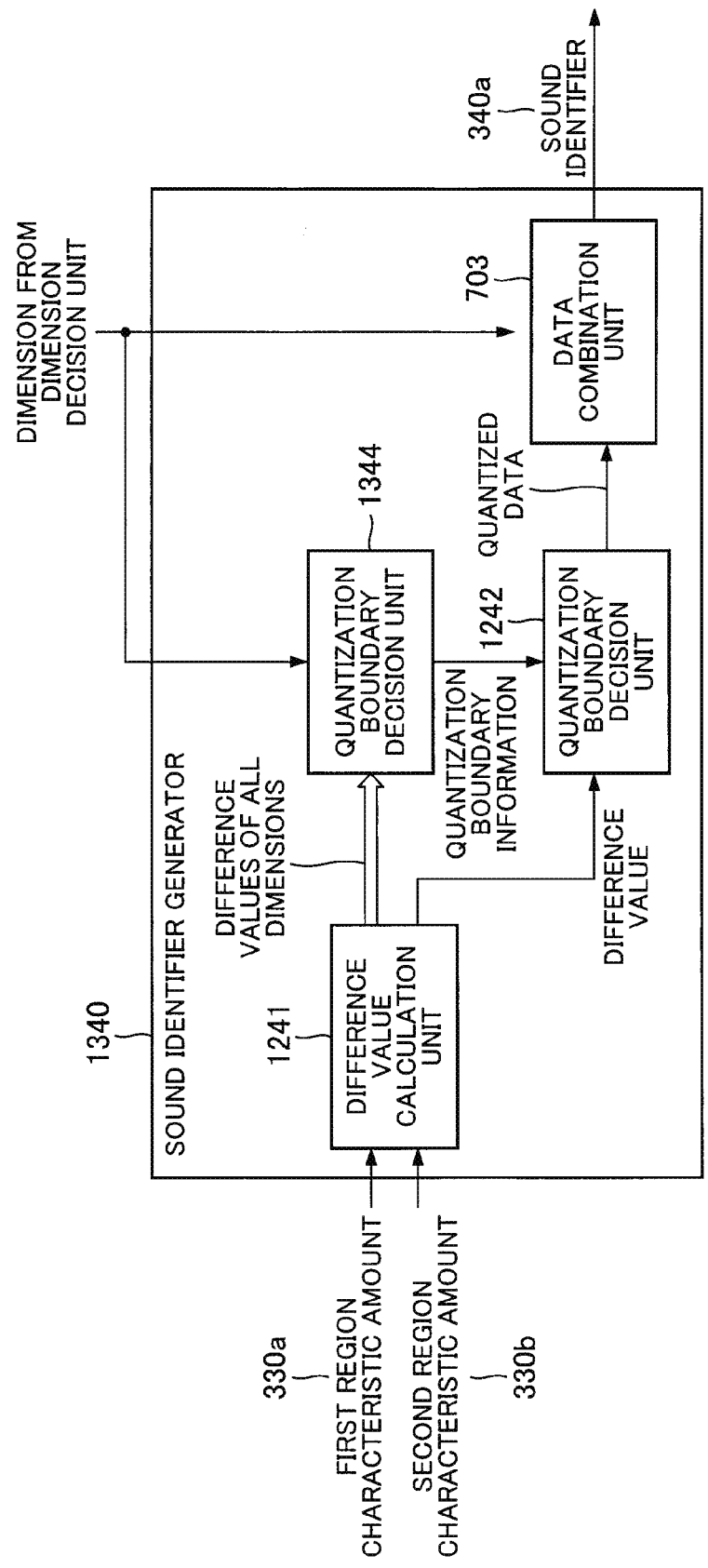
FIG. 13 is a block diagram showing a structure of a sound identifier generator according to the fourth exemplary embodiment of the present invention.

FIG. 13 is a block diagram which shows a structure of a sound identifier generator 1340 according to this exemplary embodiment.

The sound identifier generator 1340 includes the difference value calculation unit 1241, the quantization unit 1242, a quantization boundary decision unit 1344 and the data combination unit 703. Further, since the functions of the difference value calculation unit 1241, the quantization unit 1242 and the data combination unit 703 are similar to FIG. 12 of the third exemplary embodiment, their explanation will be omitted.

The quantization boundary decision unit 1344, when the difference values of all dimensions between the first region characteristic amount 330a and the second region characteristic amount 330b supplied from the difference value calculation unit 1241 are supplied, decides the boundary of quantization on the basis of the distribution of the difference values of all dimensions and supplies the decided quantization boundary information to the quantization unit 1242. Here, the distribution of the difference values of all dimensions is a frequency (probability) of occurrence for difference values.

Further, in case the difference value is a scalar quantity, for example, a range (that is, threshold values) corresponding to each quantization level (+1, 0 or −1) is decided and the range (threshold values) is supplied to the quantization unit 1242 as the quantization boundary information. Also, in case the difference value is a vector quantity, a parameter for performing, for example, vector quantization, for example, a representative vector of each quantized index (such as a center of gravity vector) is decided, and it is supplied to the quantization unit 1242 as the information of the quantization boundary.

The quantization boundary decision unit 1344 may, in case the difference value is a scalar quantity and quantization of M values is performed (M=2, 3, . . . and so on), on the basis of the distribution of the difference values of all dimensions, decide the range (threshold values) of quantization so that a proportion of the respective quantized indices for all dimensions may become even.

Also, for example, in case the difference value is a scalar quantity, and in case quantization into three values is performed, the quantization boundary decision unit 1344 determines the threshold values which show the range to be quantized to "0" which shows that there are no differences on the basis of the distribution of the difference values of all dimensions. Next, the quantization boundary decision unit 1344 supplies the decided threshold values to the quantization unit 1242. For example, the quantization boundary decision unit 1344 may calculate absolute values of the difference values of all dimensions, sort the calculated absolute values of the difference values, and output points of a certain prescribed proportion (further, this prescribed proportion is supposed to be provided as, for example, an input) from its highest rank or lowest rank as the threshold value.

As for the prescribed proportion, a case when it is made P % of a percentage (for example, P=25%) is taken as an example, and will be explained specifically. The quantization boundary decision unit 1344 sorts the absolute values of the difference values of all dimensions (suppose number of dimensions=N) in ascending order. In this case, a set of the absolute values of the difference values sorted in ascending order is represented as $D(i)=\{D(0), D(1), D(2), \ldots, D(N-1)\}$. Here, the value at the position of P % from the lowest rank in the permutation sorted in ascending order will be, for example, $D(\text{floor}(N \times P/100))$ and the threshold value will be $th=D(\text{floor}(N \times P/100))$. Further, floor( ) is a function which truncates those below the radix point.

Further, the quantization boundary decision unit 1344 may, other than making the prescribed proportion mentioned above into the threshold value, for example, decide the threshold values so that the proportion of the quantized data of (+1, 0, −1) may approach even.

According to the decision of the quantization boundary by the quantization boundary decision unit 1344 of this exemplary embodiment, for example, in case the fixed threshold value in the third exemplary embodiment is used, for a sound with a few ups and downs of power spectrum on the time-frequency plane, there is a room that the quantized data of a large majority of the dimensions (or all dimensions) will become "0".

In contrast, when the adaptive threshold value in this exemplary embodiment is used, since the threshold value is adjusted automatically to a small value for the sound with a few ups and downs, a situation in which the quantized data of a large majority of the dimensions will be "0" does not occur.

<<Operation Procedure of the Sound Processing Device>>

Figure 14:
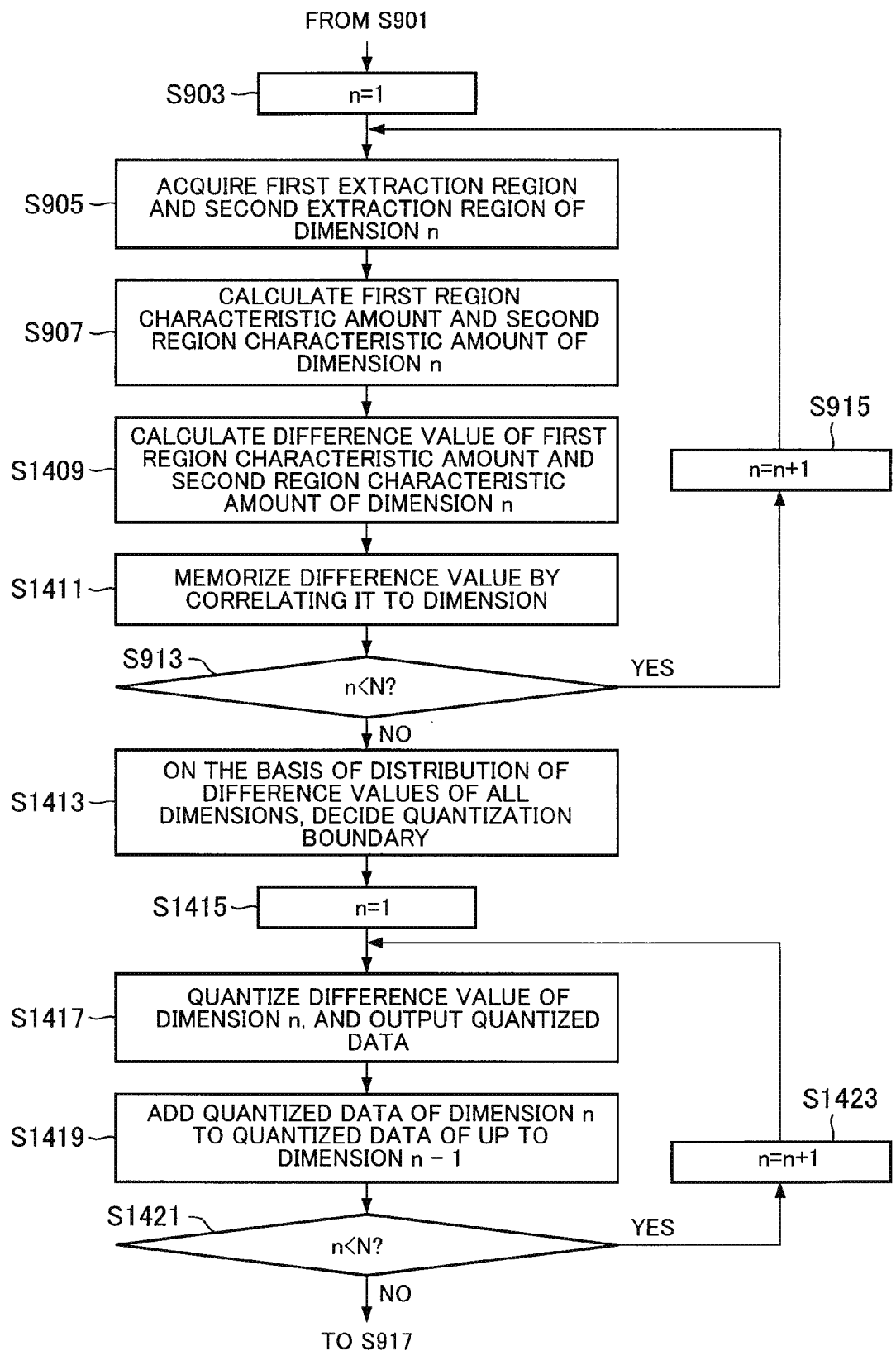
FIG. 14 is a flow chart showing an operation procedure of a sound processing device according to the fourth exemplary embodiment of the present invention.

FIG. 14 is a flow chart showing an operation procedure of the sound processing device according to this exemplary embodiment.

The CPU 810 of FIG. 8 executes this flow chart by using the RAM 840. Each functional structure unit of FIGS. 3-5 and FIG. 13 executes this flow chart by the CPU 810. Further, in order to execute this exemplary embodiment, a region which memorizes data of the quantization boundary in the RAM 840 of FIG. 8 is added, and a quantization boundary decision module is added to the storage 850.

Also, in FIG. 14, as for Steps S901 and S917 in FIG. 9 of the second exemplary embodiment, their description will be omitted. Also, to steps which perform the same processing as FIG. 9, the same step number is attached and their explanation will be omitted.

First, in the loop which calculates the difference of each dimension, in Step S905, the extraction region acquisition unit 502 of the region characteristic amount extractor 330 acquires the first region characteristic amount and the second region characteristic amount of the dimension n. And in Step S907, the region characteristic amount extractor 503 of the region characteristic amount extractor 330 calculates the first region characteristic amount and the second region characteristic amount of the dimension n. After that, in Step S1409, the difference value calculation unit 1241 calculates the difference value of the first region characteristic amount and the second region characteristic amount of the dimension n. In Step S1411, the difference value of the dimension n is memorized by correlating it to the dimension n.

When calculation of the difference values of all dimensions is completed, the sound identifier generator 1340 proceeds from Step S913 to S1413, and the quantization boundary decision unit 1344 of the sound identifier generator 1340 decides the quantization boundary on the basis of the distribution of the difference values of all dimensions.

Next, in the quantization loop of each dimension, first, in Step S1415, the loop value n is initialized to "1". In Step S1417, the quantization unit 1242 of the sound identifier generator 1340 quantizes the difference value of the dimension n and outputs the quantized data. And in Step S1419, the data combination unit 703 of the sound identifier generator 1340 adds the outputted quantized data of the dimension n to the quantized data of up to the dimension n−1.

In Step S1421, the sound identifier generator 1340 repeats the quantization loop of each dimension by performing +1 in Step S1423 until the loop value n will be the number of all dimensions N. When quantization of all dimensions is completed, processing proceeds to Step S917.

[The Fifth Exemplary Embodiment]

Next, a sound processing device according to the fifth exemplary embodiment of the present invention will be explained.

The sound processing device according to this exemplary embodiment is, when compared with the second to fourth exemplary embodiment mentioned above, different in a point that extraction method of the region characteristic amount is selected for each dimension (that is, for each partial region pair). Since other structures and operations are similar to those of the second exemplary embodiment, the same codes are attached to the same structures and operations and their detailed explanation will be omitted.

According to this exemplary embodiment, since the region characteristic amount calculation methods are different among the dimensions (there is a variety in the region characteristic amount calculation methods), correlation between the dimensions can be made even smaller. Accordingly, in addition to the effect of the exemplary embodiment mentioned above, identification capability which is a degree which can identify different sounds can be made even higher.

<<Functional Structure of the Sound Processing Device>>

Figure 15:
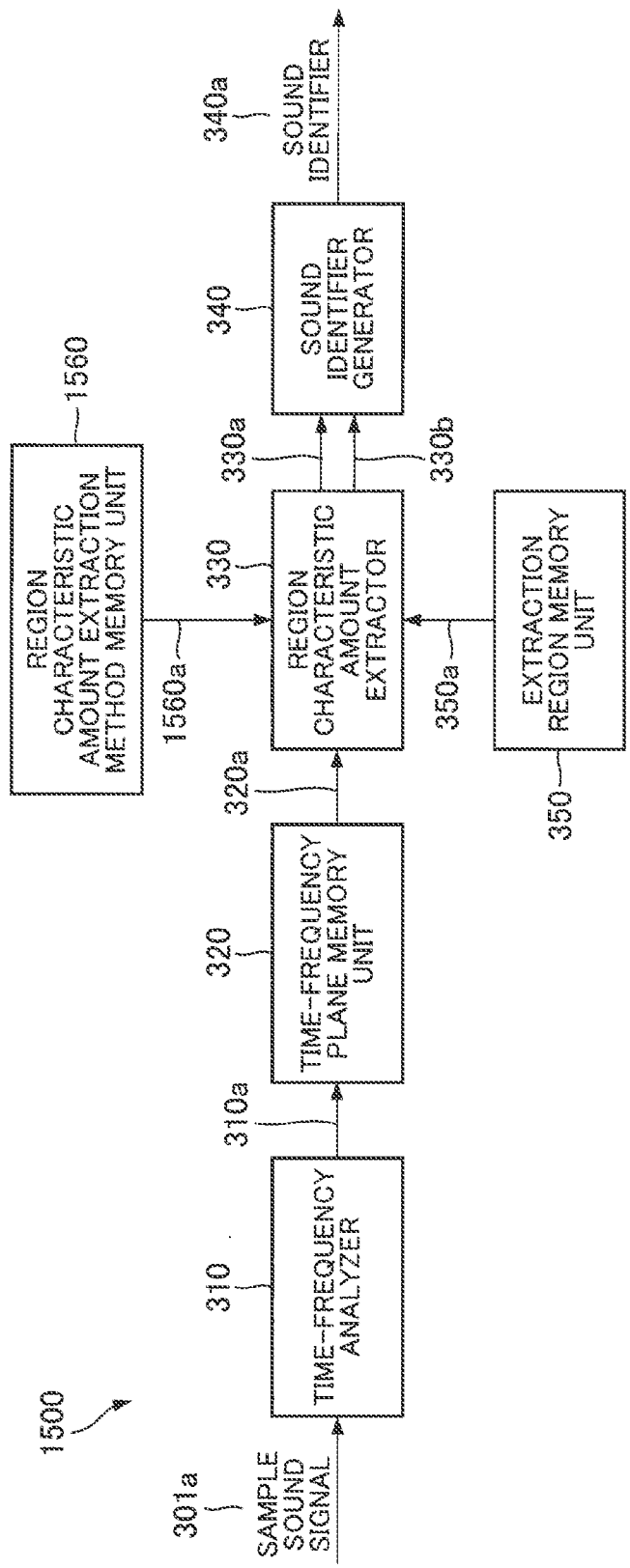
FIG. 15 is a block diagram showing a functional structure of a sound processing device according to the fifth exemplary embodiment of the present invention.

FIG. 15 is a block diagram showing a functional structure of a sound processing device 1500 according to this exemplary embodiment.

Further, in FIG. 15, the same codes are attached to the functional structure units including the similar functions as FIG. 3 of the second exemplary embodiment and their detailed explanation will be omitted.

A characteristic structure in FIG. 15 is a point that a region characteristic amount extraction method memory unit 1560 which memorizes extraction methods of the region characteristic amount is included.

The region characteristic amount extraction method memory unit 1560 memorizes, corresponding to each dimension (since it is known in which shape and in which position the partial region pair in each dimension includes the first partial region and the second partial region), the region characteristic amount extraction methods appropriate for region characteristic amount extraction.

And a region characteristic amount extractor 1530 extracts the region characteristic amount of the first partial region and the second partial region according to a region characteristic amount extraction method 1560a sent from the region characteristic amount extraction method memory unit 1560 corresponding to each dimension and outputs it to the sound identifier generator 340.

(Region Characteristic Amount Extractor)

Figure 16:
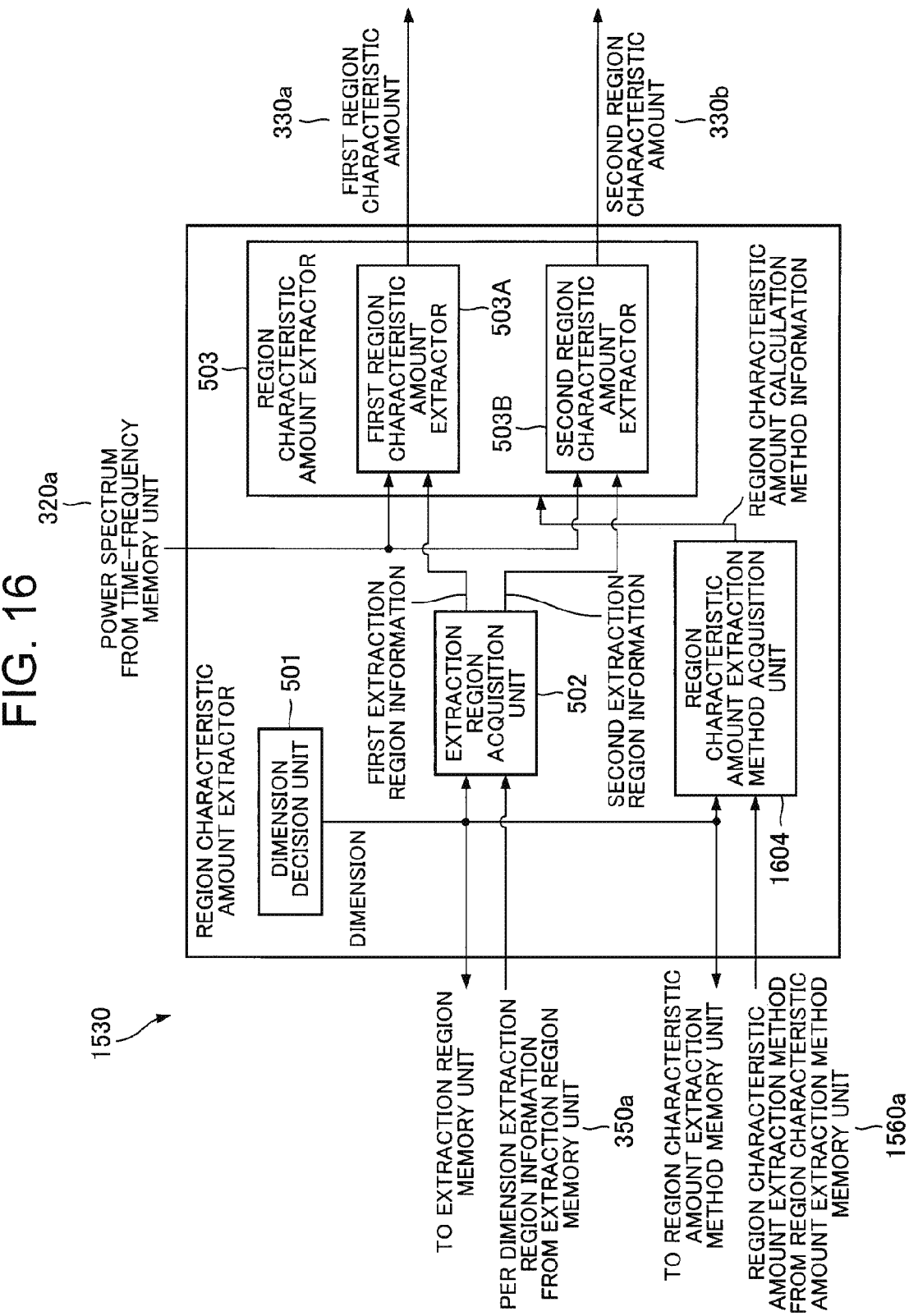
FIG. 16 is a block diagram showing a structure of a region characteristic amount extractor according to the fifth exemplary embodiment of the present invention.

FIG. 16 is a block diagram showing a structure of the region characteristic amount extractor 1530 according to this exemplary embodiment.

In FIG. 16, the same reference codes are attached to the functional structure units which fulfill the similar functions as FIG. 5 of the second exemplary embodiment and their detailed explanation will be omitted.

A region characteristic amount extraction method acquisition unit 1604 is added newly to the region characteristic amount extractor 1530 of FIG. 16.

The region characteristic amount extraction method acquisition unit 1604 acquires the region characteristic amount extraction method corresponding to each dimension from the region characteristic amount extraction method memory unit 1560 and outputs region characteristic amount calculation method information to the region characteristic amount extractor 503 which performs region characteristic amount extraction according to the extraction method.

(Region Characteristic Amount Extraction Method Memory Unit)

FIG. 17 is a figure showing a structure of the region characteristic amount extraction method memory unit 1560 according to this exemplary embodiment.

Further, in this exemplary embodiment, although a case when the region characteristic amount extraction method memory unit 1560 memorizes one set of region characteristic amount extraction method corresponding to each dimension is explained, a structure which memorizes a plurality of different sets according to a classification or a characteristic of the sound and which selects one set according to the sound signal to be inputted may also be fine.

The region characteristic amount extraction method memory unit 1560 of FIG. 17 memorizes the region characteristic amount extraction method by correlating them to each dimension 1701. Corresponding to a signal representing each dimension, the region characteristic amount extraction method 1702 is read out, and is sent to the region characteristic amount extraction method acquisition unit 1604 of the region characteristic amount extractor 1530.

Further, when an order of the dimension is fixed, a structure which reports not the signal representing the dimension but end of region characteristic amount extraction, and which reads out the next region characteristic amount extraction method is also fine.

<<Operation Procedure of the Sound Processing Device>>

Figure 18:
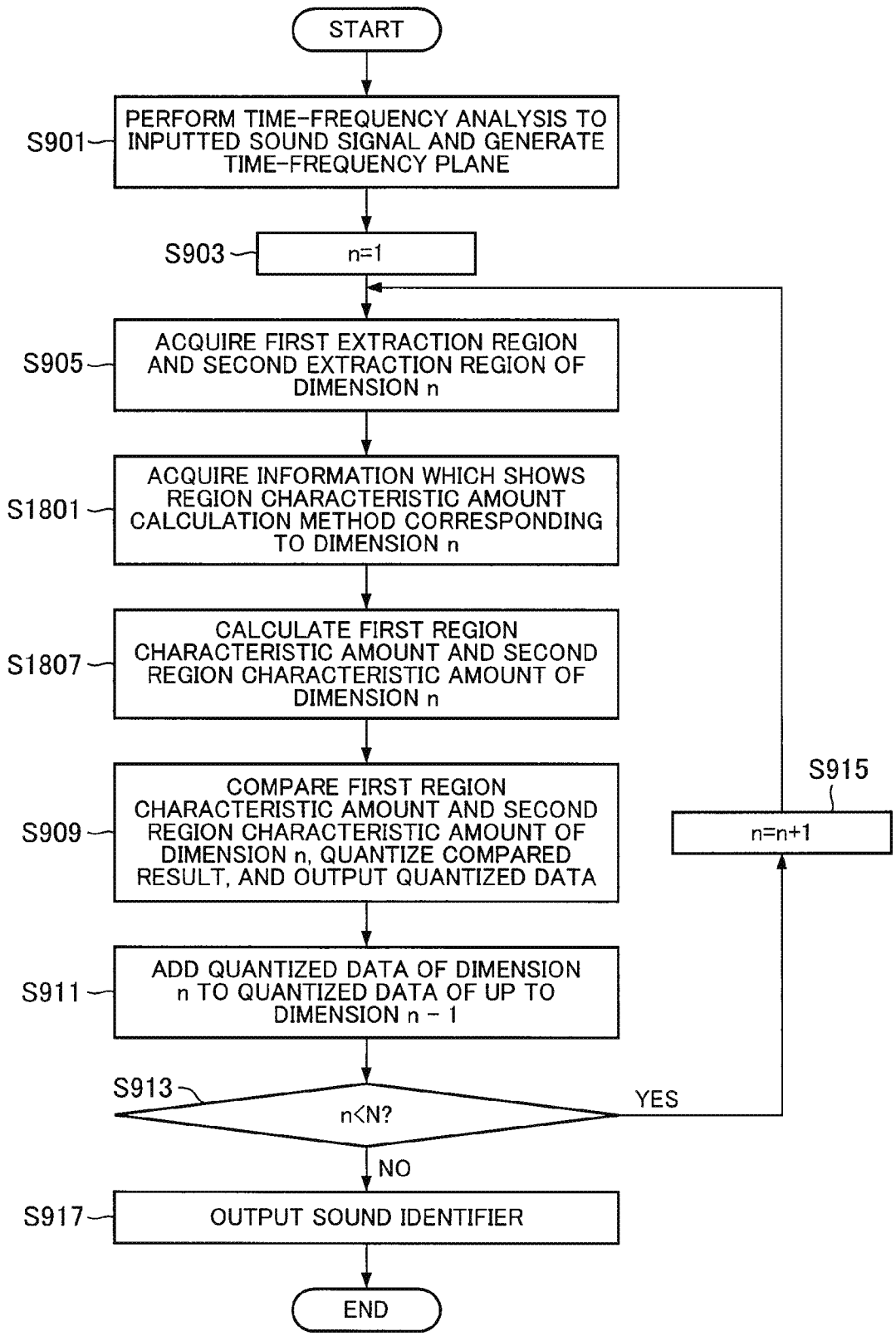
FIG. 18 is a flow chart showing an operation procedure of a sound processing device according to the fifth exemplary embodiment of the present invention.

FIG. 18 is a flow chart showing an operation procedure of the sound processing device according to this exemplary embodiment.

The CPU 810 of FIG. 8 executes this flow chart by using the RAM 840. Each functional structure unit of FIG. 15, FIG. 4, FIG. 7 and FIG. 13 executes this flow chart by the CPU 810.

Further, in order to execute this exemplary embodiment, a region memorizing the dimension which is being executed and a region memorizing the region characteristic amount extraction information of the dimension are added in the RAM 840 of FIG. 8. Also, the region characteristic amount extraction method memory unit 1560 and a region characteristic amount extraction method acquisition module are added to the storage 850. Also, in FIG. 18, the same step numbers are attached to the steps which perform the same processing as FIG. 9, and their explanation will be omitted.

A characteristic step in FIG. 18 is an addition of Step S1801. In Step S1801, the region characteristic amount extractor 1530 acquires the region characteristic amount calculation method corresponding to the dimension n or the information which shows that from the region characteristic amount extraction method memory unit 1560. And in Step 1807, by the region characteristic amount extraction method acquired in Step S1801, the first region characteristic amount and the second region characteristic amount are extracted in the region characteristic amount extractor 1530. Further, Step S1801 may also be placed before Step S905.

[The Sixth Exemplary Embodiment]

Next, a sound processing device according to the sixth exemplary embodiment of the present invention will be explained.

The sound processing device according to this exemplary embodiment is, when compared with the second to the fifth exemplary embodiment mentioned above, different in a point that a comparison/quantization method memory unit memorizes a comparison/quantization method corresponding to each dimension and the sound identifier generator performs comparison/quantization corresponding to each dimension.

Since other structures and operations are similar to those of the second exemplary embodiment, the same structures and operations are attached the same codes and their detailed explanation will be omitted.

According to this exemplary embodiment, since the comparison/quantization methods are different among the dimensions (there is a variety in the comparison/quantization methods), correlation between the dimensions can be made even smaller. Accordingly, in addition to the effect of the second exemplary embodiment, identification capability which is a degree which can identify different images can be made even higher.

<<Functional Structure of the Sound Processing Device>>

Figure 19:
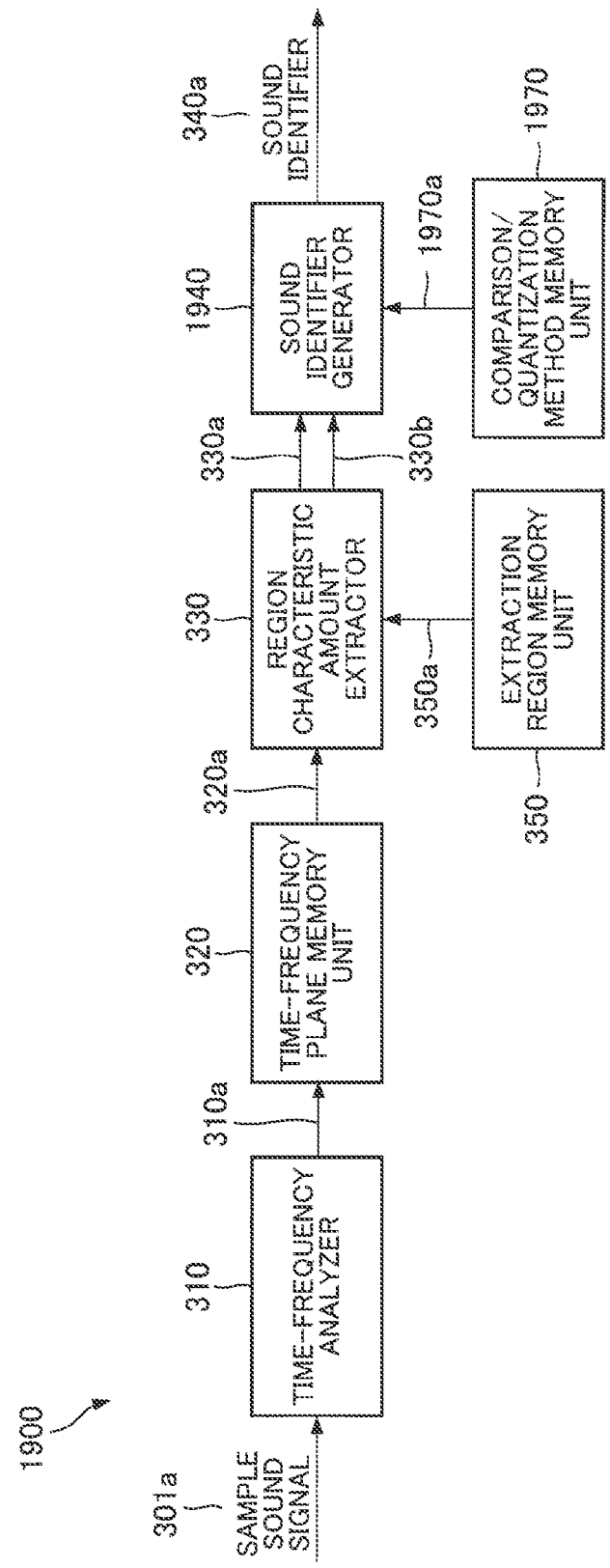
FIG. 19 is a block diagram showing a functional structure of a sound processing device according to the sixth exemplary embodiment of the present invention.

FIG. 19 is a block diagram showing a functional structure of a sound processing device 1900 according to this exemplary embodiment.

Further, in FIG. 19, the same codes are attached to the functional structure units including the similar functions as FIG. 3 of the second exemplary embodiment and their detailed explanation will be omitted.

A characteristic structure in FIG. 19 is a point that a comparison/quantization method memory unit 1970 which memorizes the comparison/quantization methods is included. The comparison/quantization method memory unit 1970 memorizes, corresponding to each dimension (since it is known in which shape and in which position the partial region pair in each dimension includes the first partial region and the second partial region), the comparison/quantization methods appropriate for comparison/quantization.

And a sound identifier generator 1940 performs comparison/quantization according to a comparison/quantization method 1970a sent from the comparison/quantization method memory unit 1970 corresponding to each dimension, and generates the sound identifier from the results of all dimensions.

(Sound Identifier Generator)

FIG. 20 is a block diagram showing a structure of the sound identifier generator 1940 according to this exemplary embodiment.

In FIG. 20, the same reference codes are attached to the functional structure units which fulfill the similar functions as FIG. 7 of the second exemplary embodiment and their detailed explanation will be omitted.

In the sound identifier generator 1940 of FIG. 20, a comparison/quantization method acquisition unit 2004 is added newly. The comparison/quantization method acquisition unit 2004 acquires the comparison/quantization method corresponding to each dimension from the comparison/quantization method memory unit 1970 and outputs the comparison/quantization method information to the size comparison unit 701 and the quantization unit 702 which perform comparison/quantization according to the comparison/quantization method.

(Comparison/Quantization Method Memory Unit)

FIG. 21 is a figure showing a structure of the comparison/quantization method memory unit 1970 according to this exemplary embodiment.

Further, in this exemplary embodiment, although a case when the comparison/quantization method memory unit 1970 memorizes one set of comparison/quantization method corresponding to each dimension is explained, a structure which memorizes a plurality of different sets according to a classification and a characteristic of the sound and which selects one set according to the sound signal to be inputted may also be fine.

The comparison/quantization method memory unit 1970 of FIG. 21 memorizes a comparison/quantization method 2102 by correlating it to each dimension 2101. Corresponding to a signal which represents each dimension, the comparison/quantization method 2102 is read out, and is sent to the comparison/quantization method acquisition unit 2004 of the sound identifier generator 1940. Further, when an order of the dimension is fixed, a structure which reports not the signal representing the dimension but end of comparison/quantization, and reads out the next comparison/quantization method is also fine.

In FIG. 21, a comparison/quantization method A is binarization of size comparison. A comparison/quantization method B is ternarization which includes quantization boundaries with the same threshold value between which quantized to "0". A comparison/quantization method C is quantization of no smaller than four values. A comparison/quantization method D is a method which, in case the region characteristic amount is a vector value, converts it into a scalar quantity and performs quantization. A comparison/quantization method E performs quantization so that, in case the region characteristic amount is a vector value, a degree of similarity to a representative vector such as a center of gravity vector will become maximum (minimum distance). A comparison/quantization method F decides the boundaries of quantization so that proportion to all dimensions may become even and performs quantization on the basis of that. A comparison/quantization method G is quantization which calculates absolute values of the difference values of all dimensions, sorts the calculated absolute values of the difference values, and makes points of a certain prescribed proportion from its highest rank or lowest rank the quantization boundary (threshold value). A comparison/quantization method H decides the quantization boundaries (threshold values) not by the prescribed proportion like the comparison/quantization method G, but so that the proportion of the quantized index of +1, 0 or −1 may approach even.

Also, in FIG. 21, M is a number of levels of quantization and th is a threshold value which decides a fixed quantization boundary.

<<Operation Procedure of the Sound Processing Device>>

Figure 22:
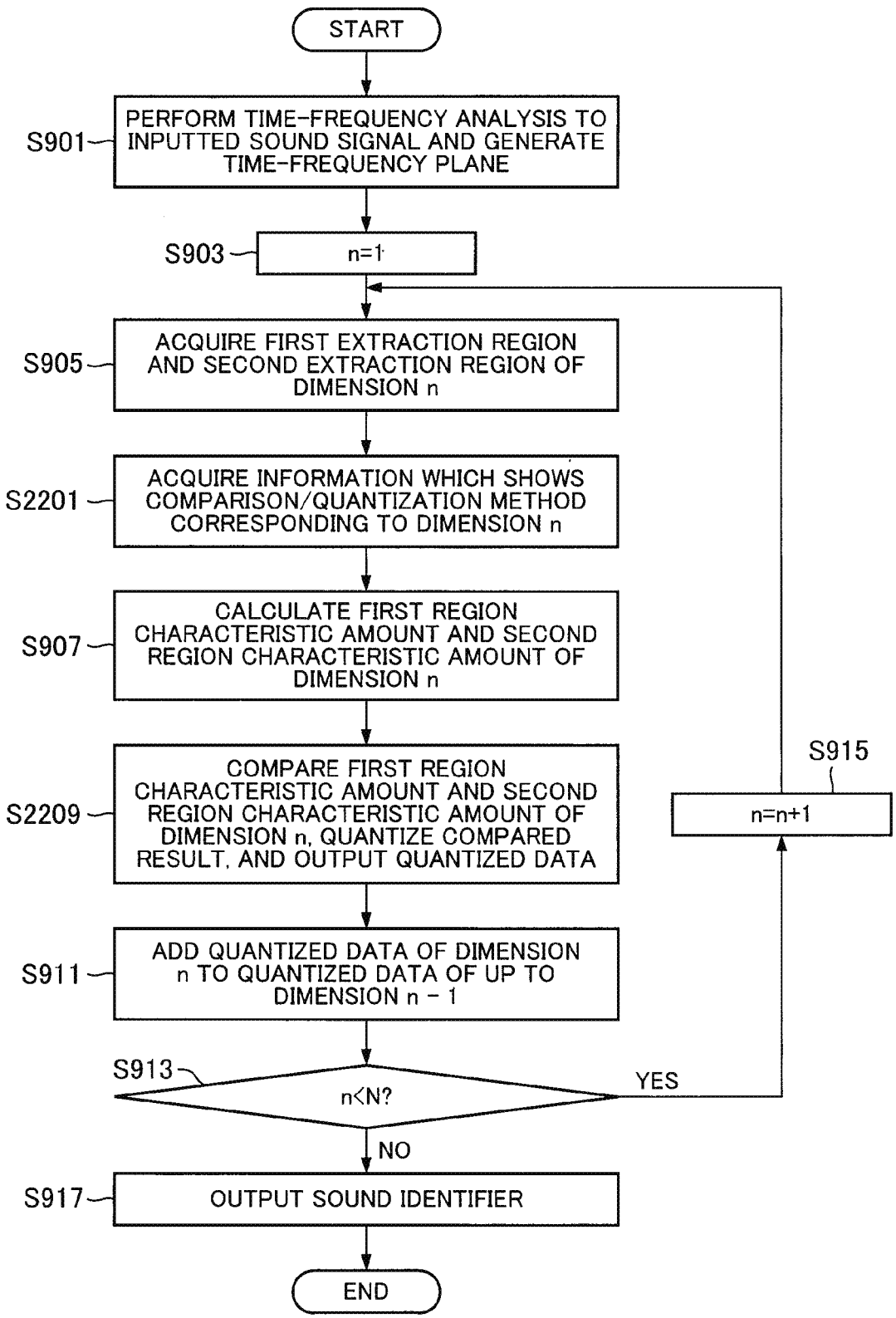
FIG. 22 is a flow chart showing an operation procedure of a sound processing device according to the sixth exemplary embodiment of the present invention.

FIG. 22 is a flow chart showing an operation procedure of the sound processing device according to this exemplary embodiment.

The CPU 810 of FIG. 8 executes this flow chart by using the RAM 840. Each functional structure unit of FIG. 19, FIG. 4, FIG. 5 and FIG. 19 executes this flow chart by the CPU 810.

Further, in order to execute this exemplary embodiment, a region memorizing the dimension which is being executed and a region memorizing the comparison/quantization method information of the dimension are added to the RAM 840 of FIG. 8. Also, the comparison/quantization method memory unit 1970 and a comparison/quantization method acquisition module are added to the storage 850. Also, in FIG. 22, the same step numbers are attached to the steps which perform the same processing as FIG. 9, and their explanation will be omitted.

A characteristic step in FIG. 22 is an addition of Step S2201. In Step S2201, the sound identifier generator 1940 acquires the comparison/quantization method corresponding to the dimension n or the information which shows it from the comparison/quantization method memory unit 1970. And in Step S2209, by the comparison/quantization method acquired in Step S2201, the sound identifier generator 1940 executes comparison/quantization. Further, Step S2201 may be placed before Step S905 or after Step S907.

[The Seventh Exemplary Embodiment]

Next, a sound processing system according to the seventh exemplary embodiment of the present invention to which the sound processing device of the present invention mentioned above is applied will be explained.

Compared with the second to the sixth exemplary embodiment mentioned above, it is different in a point that the sound identifier generation method memory unit memorizes the sound identifier generation method corresponding to each dimension and the sound identifier generation corresponding to each dimension is performed. Since other structures and operations are similar to those of the second exemplary embodiment, the fifth exemplary embodiment and the sixth exemplary embodiment, the same structures and operations are attached the same codes and their detailed explanation will be omitted.

According to this exemplary embodiment, because the sound identifier generation methods are different among the dimensions (there is a variety in the sound identifier generation methods), correlation between the dimensions can be made even smaller. Accordingly, in addition to the effect of the second exemplary embodiment, identification capability which is a degree which can identify different images can be made even higher.

<<Functional Structure of the Sound Processing Device>>

Figure 23:
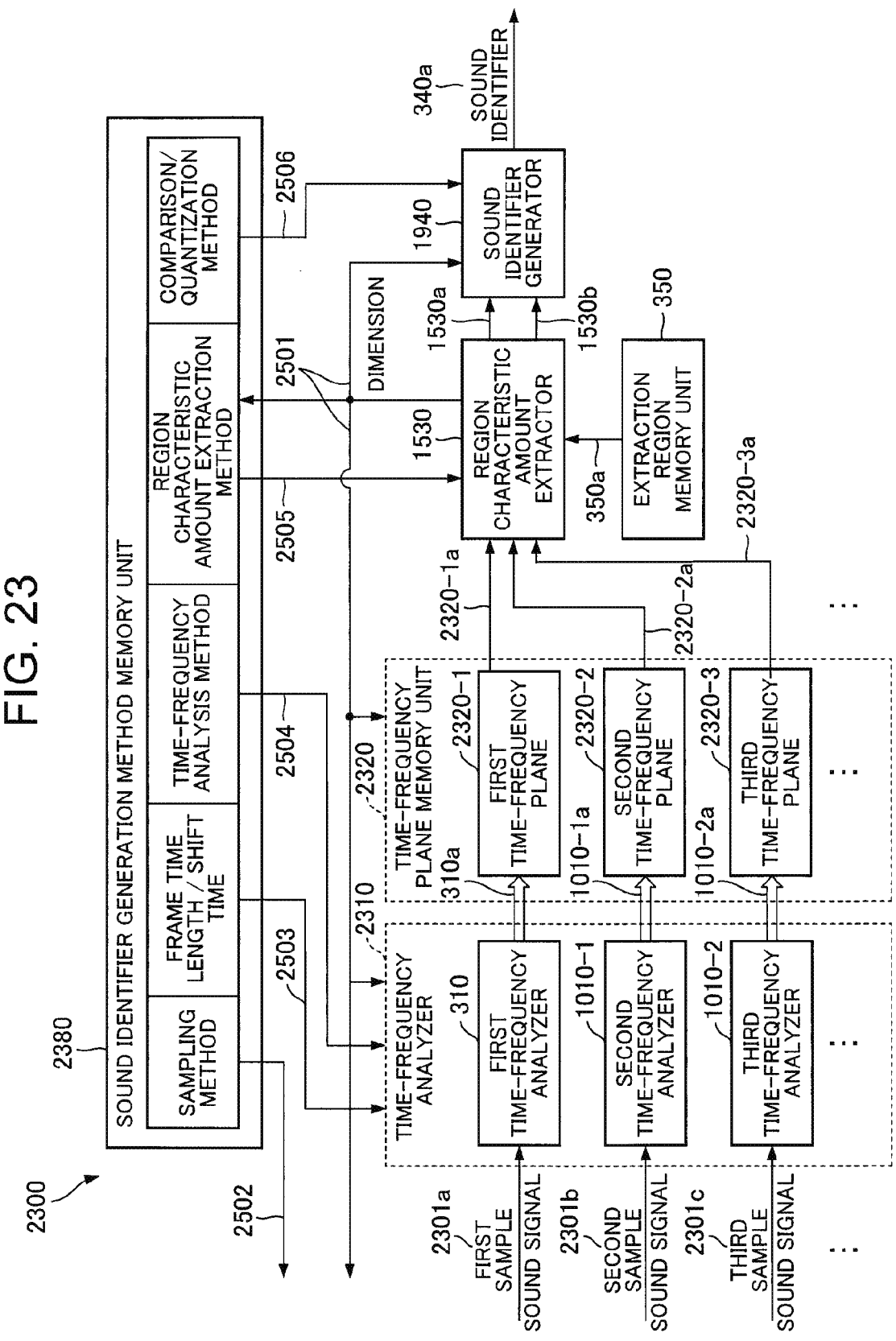
FIG. 23 is a block diagram showing a functional structure of a sound processing device according to the seventh exemplary embodiment of the present invention.

FIG. 23 is a block diagram showing a functional structure of a sound processing device 2300 according to this exemplary embodiment.

Further, in this exemplary embodiment, the same reference numbers are attached to the functional structure units which fulfill the similar functions as FIG. 15 of the fifth exemplary embodiment and FIG. 19 of the sixth exemplary embodiment and their explanation will be omitted.

This exemplary embodiment is different from the exemplary embodiments mentioned above in including a sound identifier generation method memory unit 2380. In the sound identifier generation method memory unit 2380, the sampling method, the frame time length/shift time, the time-frequency analysis method, the region characteristic amount extraction method and the comparison/quantization method are memorized by correlating them to the dimension.

Further, in FIG. 23, the reason why the dimension is outputted from the region characteristic amount extractor 1530 is because it is made to correspond to FIG. 5 of the second exemplary embodiment. The dimension decision unit may be within a component other than the region characteristic amount extractor or may also be outside as an independent component.

First, the sound identifier generation method memory unit 2380 selects a sampling method corresponds to the dimension. Either of sample sound signals 2301*a*-2301*c* which are sampled and inputted by a sampling method 2502 selected is analyzed corresponding to the dimension by the first time-frequency analyzer 310, the second time-frequency analyzer 1010-1 or the third time-frequency analyzer 1010-2 which is selected according to a time-frequency analysis method 2504 from within a time-frequency analyzer 2310.

Also, corresponding to the dimension, a frame time length/shift time 2503 may also be changed. Further, although only three sampling methods and actual feeling frequency analysis methods are shown in FIG. 23, number of them is not limited.

Although the first time-frequency analyzer 310, the second time-frequency analyzer 1010-1 and the third time-frequency analyzer 1010-2 are made to correspond to FIG. 4, FIG. 10A and FIG. 10B of the exemplary embodiments mentioned above, they are not limited to these. For example, the time-frequency analyzer 1010-3 illustrated in FIG. 10C may also be used.

The first time-frequency analyzer 310, the second time-frequency analyzer 1010-1 and the third time-frequency analyzer 1010-1 output the time-frequency data 310*a*, 1010-1*a* and 1010-2*a* which include power spectrum placed on the plane with time axis and frequency axis respectively.

Each time-frequency data in which time and frequency are discretized is placed on the time axis in order of time, and is arranged on a first time-frequency plane 2320-1, a second time-frequency plane 2320-2 and a third time-frequency plane 2320-3 of a time-frequency plane memory unit 2320.

The region characteristic amount extractor 1530 reads out the per dimension extraction region information 350a which shows the partial region pair in sequence and according to the number of dimensions from the partial region pair including the two partial regions memorized in the extraction region memory unit 350.

And a power spectrum 2320-1a, 2320-2a or 2320-3a in each partial region of the partial region pair from the time-frequency plane corresponding to the dimension is read out from the time-frequency plane memory unit 2320.

To the read out power spectrum in each partial region of the partial region pair from the time-frequency plane corresponding to the dimension, an operation is performed by a region characteristic amount extraction method 2505 corresponding to the dimension, and a first region characteristic amount 1530a is extracted from the first partial region and a second region characteristic amount 1530b is extracted from the second partial region.

The sound identifier generator 1940 performs, on the basis of a comparison/quantization method 2506 corresponding to the dimension, comparison and quantization into three values of the first region characteristic amount 1530a and the second region characteristic amount 1530b, and by combining the results for the number of dimensions (corresponds to the number of the partial region pairs), generates the sound identifier 340a.

(Time-Frequency Analyzer)

Figure 24:
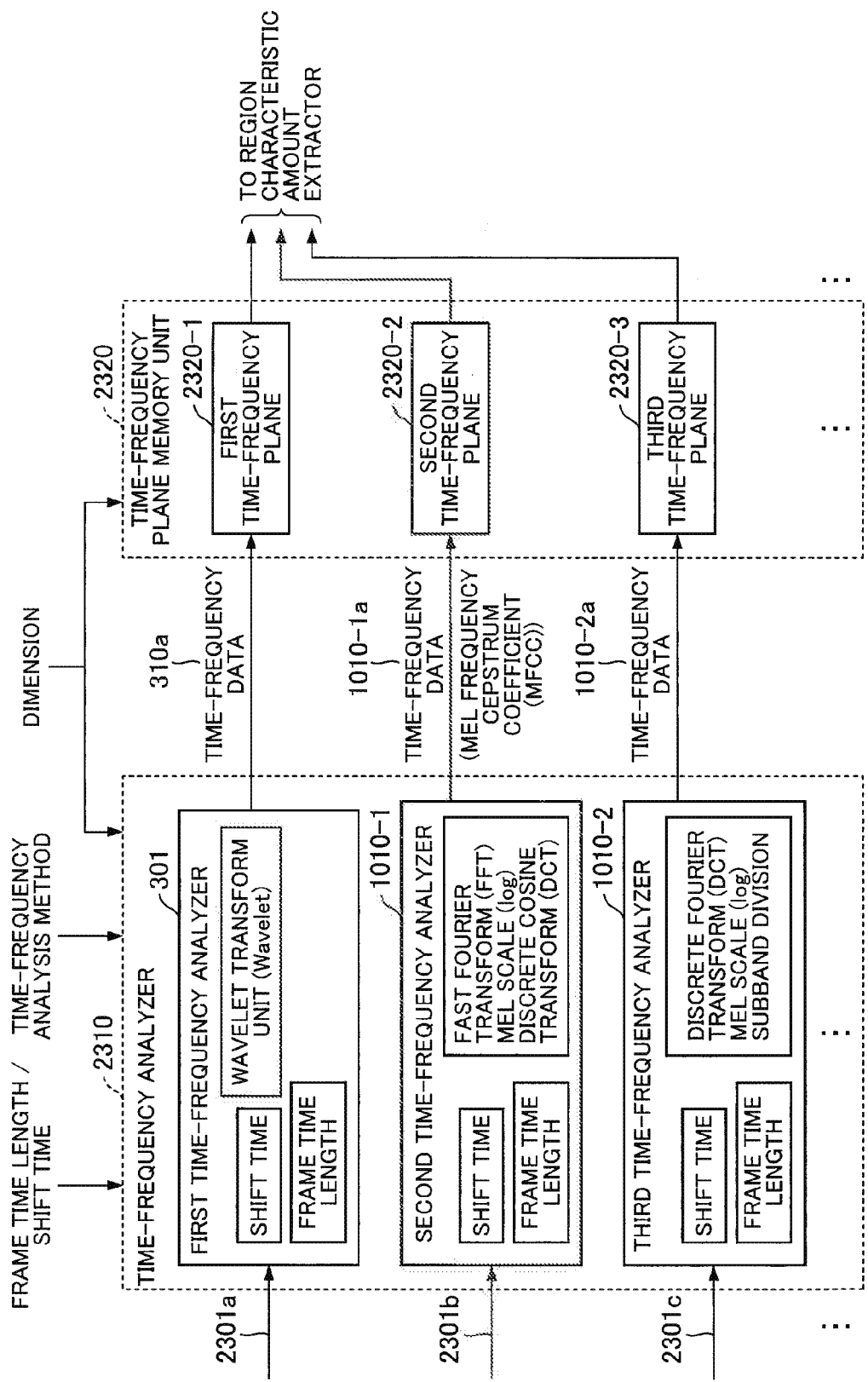
FIG. 24 is a block diagram showing a structure of a time-frequency analyzer according to the seventh exemplary embodiment of the present invention.

FIG. 24 is a block diagram showing a structure of the time-frequency analyzer 2310 according to this exemplary embodiment.

As shown in FIG. 24, the first time-frequency analyzer 310 of the time-frequency analyzer 2310 of this exemplary embodiment generates the time-frequency plane by using the wavelet transform shown in FIG. 4 of the second exemplary embodiment.

The second time-frequency analyzer 1010-1 generates the time-frequency plane by using the FFT 1002, the log 1003, the DCT 1004 shown in FIG. 10A.

The third time-frequency analyzer 1010-2 generates the time-frequency plane by using the DFT 1006, the log 1007 and the subband division 1008 shown in FIG. 10B.

The time-frequency data 310a, 1010-1a and 1010-2a outputted from the respective time-frequency analyzers are memorized on the first time-frequency plane 2320-1, the second time-frequency plane 2320-2 and the third time-frequency plane 2320-3 of the time-frequency plane memory unit 2320.

The time-frequency analyzer 2310 of this exemplary embodiment performs selection processing on the basis of the frame time length/shift time or the time-frequency analysis method from the sound identifier generation method memory unit 2380 and the dimension from the region characteristic amount extractor 1530. And the data of the first partial region and the second partial region of the time-frequency plane corresponding to the dimension are outputted to the region characteristic amount extractor 1530.

(Sound Identifier Generation Method Memory Unit)

FIG. 25 is a figure showing a structure of a sound identifier generation method memory unit 2380 according to this exemplary embodiment.

Further, methods and so on described in each field of FIG. 25 are one example, and are not limited to this arrangement. Appropriate arrangement, a number of dimensions and so on are defined according to the sound classification and the contents or sound acquisition environments and also sound memory media.

In the sound identifier generation method memory unit 2380 of FIG. 25, the sampling method 2502, the frame time length/shift time 2503, the time-frequency analysis method 2504, the region characteristic amount extraction method 2505 and the comparison/quantization method 2506 are memorized by correlating them to a dimension 2501.

Further, in this exemplary embodiment, although an example in which each method is selected is shown, there may also be one in which the method is made fixed. For example, if the region characteristic amount extraction method 2505 is selected corresponding to the dimension and others are made fixed, this corresponds to the fifth exemplary embodiment, and if the comparison/quantization method 2506 is selected corresponding to the dimension and others are made fixed, this corresponds to the sixth exemplary embodiment.

<<Operation Procedure of the Sound Processing Device>>

Figure 26:
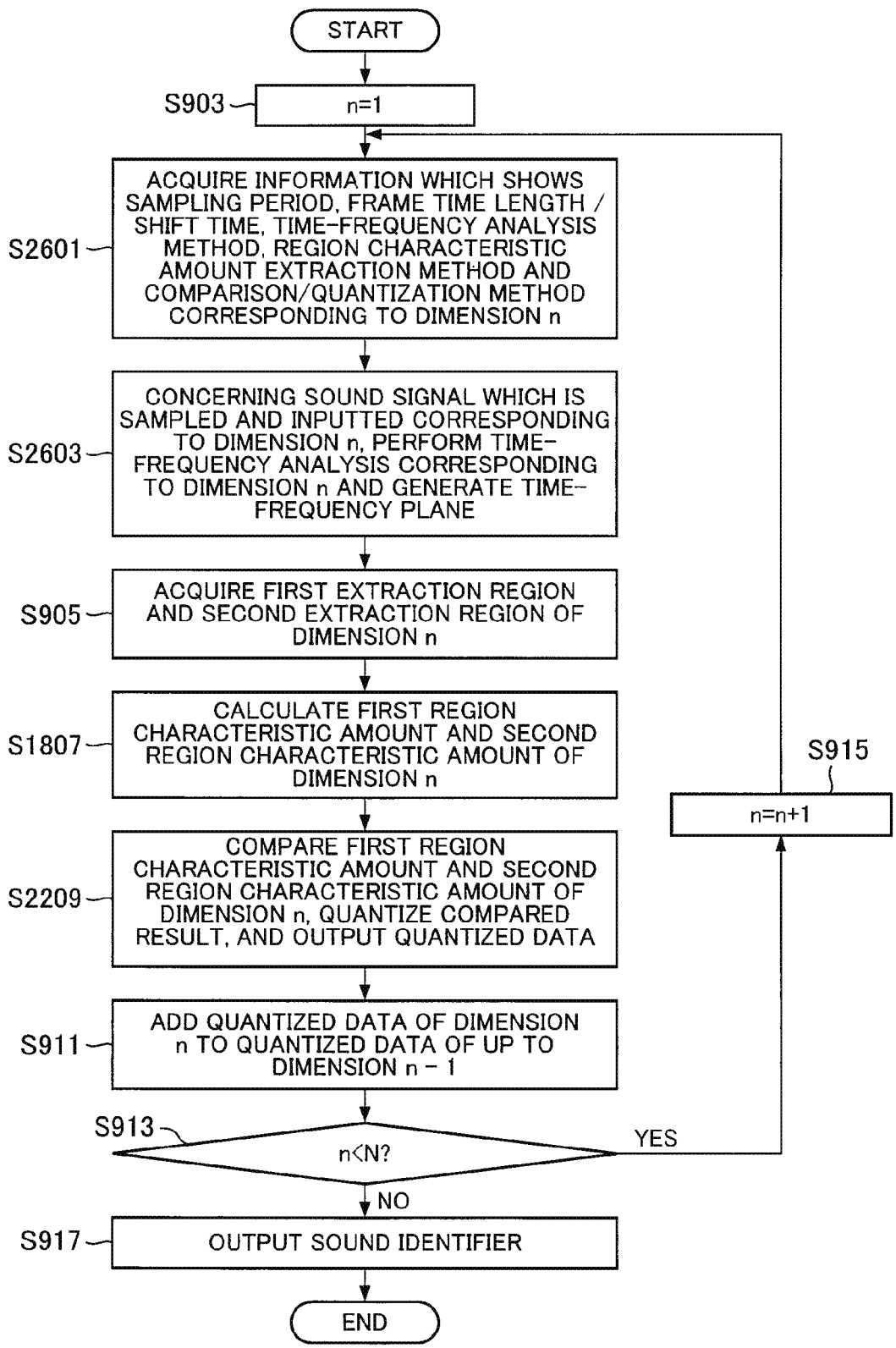
FIG. 26 is a flow chart showing an operation procedure of a sound processing device according to the seventh exemplary embodiment of the present invention.

FIG. 26 is a flow chart showing an operation procedure of the sound processing device 2300 according to this exemplary embodiment.

The CPU 810 of FIG. 8 executes this flow chart by using the RAM 840. Each functional structure unit of FIG. 23 and FIG. 24 executes this flow chart by the CPU 810. Further, in order to execute this exemplary embodiment, a region which memorizes the dimension which is being executed and a region which memorizes each method information of the dimension are added in the RAM 840 of FIG. 8, and the sound identifier generation method memory unit 2380 and a sound characteristic amount extraction method acquisition module are added to the storage 850.

Also, in FIG. 26, the same step numbers are attached to the steps which perform the same processing as FIG. 9, FIG. 18 and FIG. 22, and their explanation will be omitted.

In FIG. 26, in the first Step S903, a parameter n which shows a current dimension is initialized to "1". In Step S2601, the sound processing device 2300 acquires, corresponding to the dimension n, the sampling method 2502, the frame time length/shift time 2503, the time-frequency analysis method 2504, the region characteristic amount extraction method 2505 and the comparison/quantization method 2506 from the sound identifier generation method memory unit 2380. Next, in Step S2603, the time-frequency analyzer 2310 performs, to the sound signal which is sampled and inputted corresponding to the dimension n, time-frequency analysis corresponding to the dimension n and generates the time-frequency plane.

Following processing is a procedure which combined the processing of FIG. 9, FIG. 18 and FIG. 22. In FIG. 26, corresponding to each dimension, from the sampling method to the comparison/quantization method are selected and executed, and the sound identifier is generated by combining them. Further, corresponding to the dimension, arrangement position in the sound identifier or an operation method with other quantized data and so on may also be memorized and selected.

[The Eighth Exemplary Embodiment]

Next, a sound processing system according to the eighth exemplary embodiment of the present invention to which the sound processing device of the present invention mentioned above is applied will be explained.

The sound processing system according to this exemplary embodiment is one which applied the sound processing device of the present invention mentioned above to a sound identification system which identifies the sound contents on the basis of the sound signal which is being sent via a network. Since the structure and operation of the sound processing device are described in the second to the seventh exemplary embodiment, their detailed explanation will be omitted.

According to this exemplary embodiment, identification of the sound contents can be carried out with little amount of information and with high accuracy.

<<Structure of the Sound Processing System>>

Figure 27:
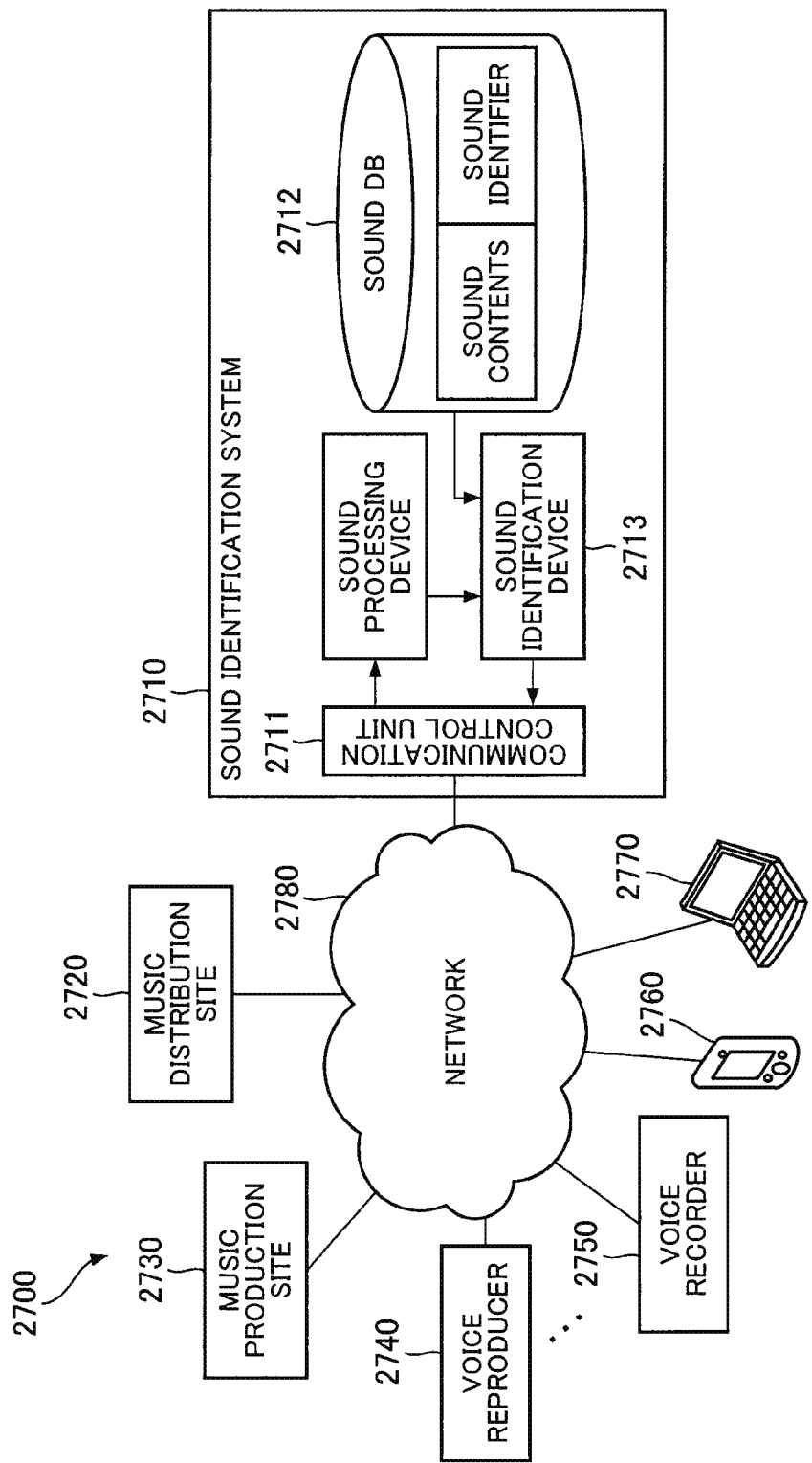
FIG. 27 is a block diagram showing a structure of a sound processing system according to the eighth exemplary embodiment of the present invention.

FIG. 27 is a block diagram showing a structure of a sound processing system 2700 according to this exemplary embodiment. The sound processing system 2700 of FIG. 27 includes a sound identification system 2710 including the sound processing device of this exemplary embodiment.

The sound identification system 2710 includes a communication control unit 2711 which receives the sound signal from various equipment via a network 2780 and sends an identified result to the various equipment. The received sound signal is inputted to the sound processing device of this exemplary embodiment and the sound identifier is generated. A sound DB 2712 accumulates the sound identifiers generated in advance by correlating them to the sound contents or their ID.

A sound identification device 2713 matches the sound identifier which the sound processing device of this exemplary embodiment generated and the sound identifiers accumulated in the sound DB 2712 and reports the sound contents corresponding to the sound identifiers which agree within a predetermined range as the identified result via the communication control unit 2711.

As the various equipment which sends the sound signal in order to identify the sound contents, one which can send a sound signal to the sound identification system 2710 via the network 2780 may be fine. For example, it may be a music distribution site 2720, a music production site 2730, a voice reproducer 2740, a voice recorder 2750, a portable terminal 2760 possible for viewing, a notebook-sized personal computer (hereinafter, PC) 2770 and so on.

[The Ninth Exemplary Embodiment]

Next, a sound processing system according to the ninth exemplary embodiment of the present invention to which the sound processing device of the present invention mentioned above is applied will be explained.

The sound processing system according to this exemplary embodiment is one which applied the sound processing device of the present invention mentioned above to a sound matching system which matches the sound contents on the basis of the sound signal which is being sent from various equipment via a network. Since the structure and operation of the sound processing device are described in the second to the seventh exemplary embodiment, their detailed explanation will be omitted.

Further, in this exemplary embodiment, although an example in which, when agreement is observed from the matching result, reporting is made as illegality exists is shown, but it is not limited to this. It is applicable to all systems which uses the result of sound matching.

According to this exemplary embodiment, matching of the sound contents can be carried out with little amount of information and with high accuracy.

<<Structure of the Sound Processing System>>

Figure 28:
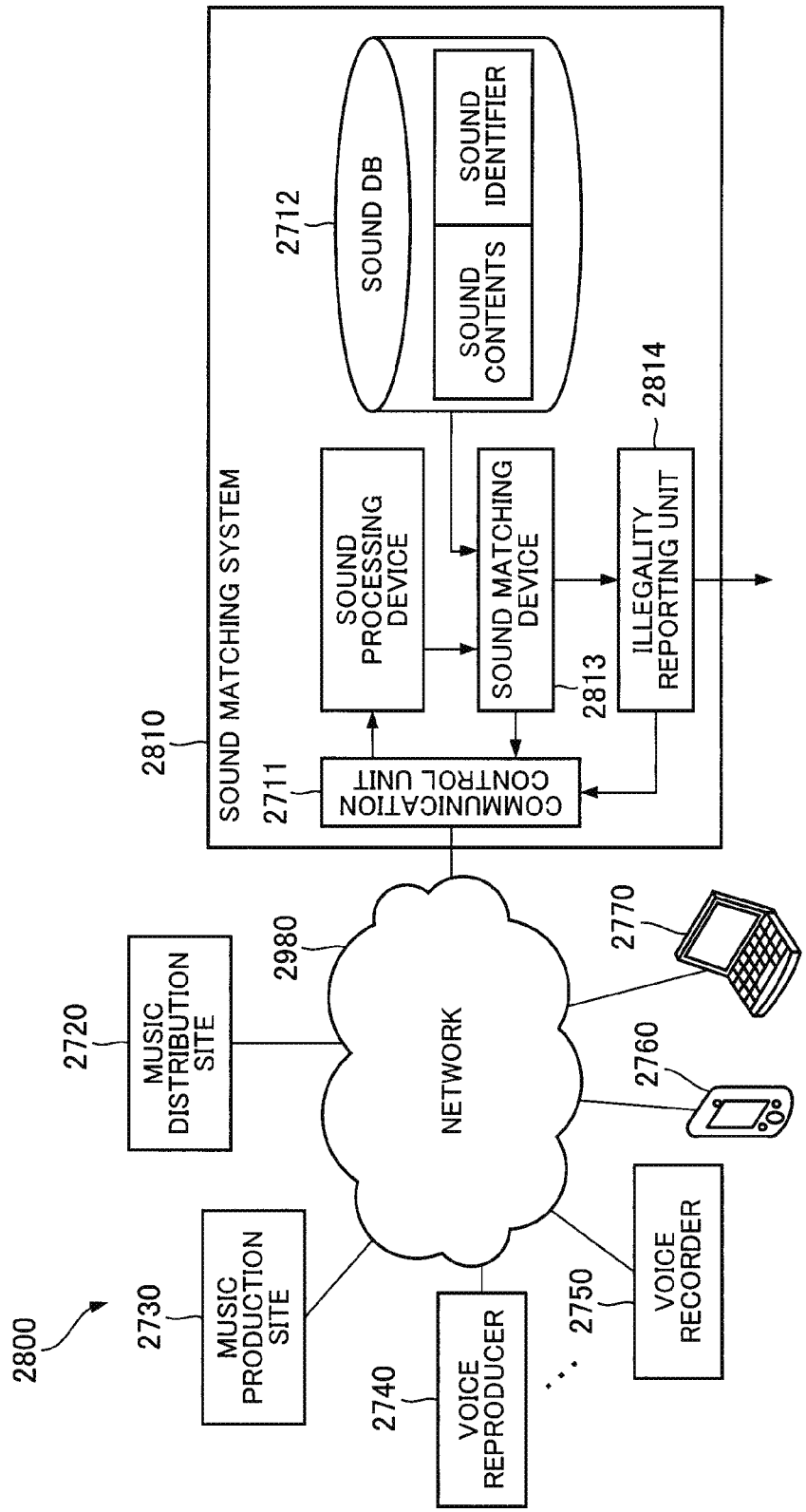
FIG. 28 is a block diagram showing a structure of a sound processing system according to the ninth exemplary embodiment of the present invention.

FIG. 28 is a block diagram showing a structure of a sound processing system 2800 according to this exemplary embodiment.

The sound processing system 2800 of FIG. 28 includes a sound matching system 2810 including the sound processing device of this exemplary embodiment.

The sound matching system 2810 includes the communication control unit 2711 which receives the sound signal from various equipment via the network 2780 and sends the matching result or an illegality determination result to the various equipment.

The received sound signal is inputted to the sound processing device of this exemplary embodiment and the sound identifier is generated. The sound DB 2712 accumulates the sound identifiers generated in advance by correlating them to the sound contents or their ID.

A sound matching device 2813 matches the sound identifier which the sound processing device of this exemplary embodiment generated and the sound identifiers accumulated in the sound DB 2712 and, when there exist sound contents which agree within a predetermined range, notifies an illegality reporting unit 2814. The illegality reporting unit 2814 reports that the inputted sound signal is one of illegal contents via the communication control unit 2711.

As the various equipment which sends the sound signal in order to match the sound contents, similar to the equipment of FIG. 27, one which can send a sound signal to the sound matching system 2810 via the network 2780 may be fine.

[The Tenth Exemplary Embodiment]

Next, a video processing system according to the tenth exemplary embodiment of the present invention to which the sound processing device of the present invention mentioned above is applied will be explained.

The video processing system according to this exemplary embodiment is one which applied the sound processing device of the present invention mentioned above to a video identification system which identifies image contents on the basis of the sound signal which is being sent from various equipment via a network. Since the structure and operation of the sound processing device are described in the second to the seventh exemplary embodiment, their detailed explanation will be omitted.

According to this exemplary embodiment, identification of the image contents can be carried out with little amount of information and with high accuracy.

<<Structure of the Video Processing System>>

Figure 29:
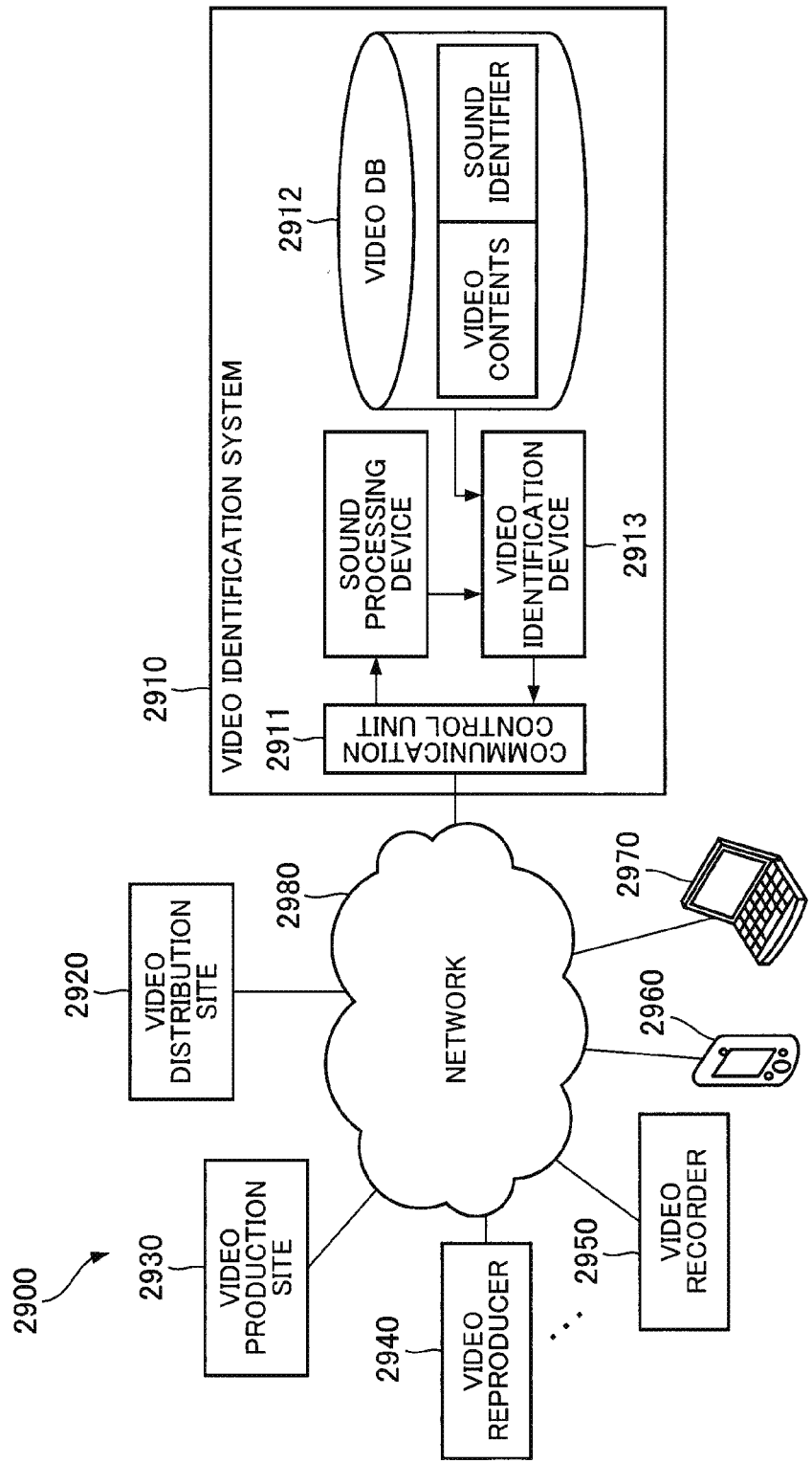
FIG. 29 is a block diagram showing a structure of a video processing system according to the tenth exemplary embodiment of the present invention.

FIG. 29 is a block diagram showing a structure of a video processing system 2900 according to this exemplary embodiment.

The video processing system 2900 of FIG. 29 includes a video identification system 2910 including the sound processing device of this exemplary embodiment.

The video identification system 2910 includes a communication control unit 2911 which receives the sound signal included in a video signal from various equipment via a network 2980 and sends the identified result to the various equipment. The received sound signal is inputted to the sound processing device of this exemplary embodiment and the sound identifier is generated. A video DB 2912 accumulates the sound identifiers generated in advance by correlating them to the image contents or their ID.

A video identification device 2913 matches the sound identifier which the sound processing device of this exemplary embodiment generated and the sound identifiers accumulated in the video DB 2912 and reports video contents corresponding to the sound identifiers which agree within a predetermined range as the identified result via the communication control unit 2911.

As the various equipment which sends the sound signal in order to identify the image contents, one which can send the sound signal to the video identification system 2910 via the network 2980 may be fine. For example, it may be a video distribution site 2920, a video production site 2930, a video reproducer 2940, a video recorder 2950, a portable terminal 2960 possible for viewing, a notebook-sized PC 2970 and so on.

[The Eleventh Exemplary Embodiment]

Next, a video processing system according to the eleventh exemplary embodiment of the present invention to which the sound processing device of the present invention mentioned above is applied will be explained.

The video processing system according to this exemplary embodiment is one which applied the sound processing device of the present invention mentioned above to a video matching system which matches the image contents on the basis of the sound signal which is being sent from various equipment via a network. Since the structure and operation of the sound processing device are described in the second to the seventh exemplary embodiment, their detailed explanation will be omitted.

According to this exemplary embodiment, matching of the image contents can be carried out with little amount of information and with high accuracy.

<<Structure of the Video Processing System>>

Figure 30:
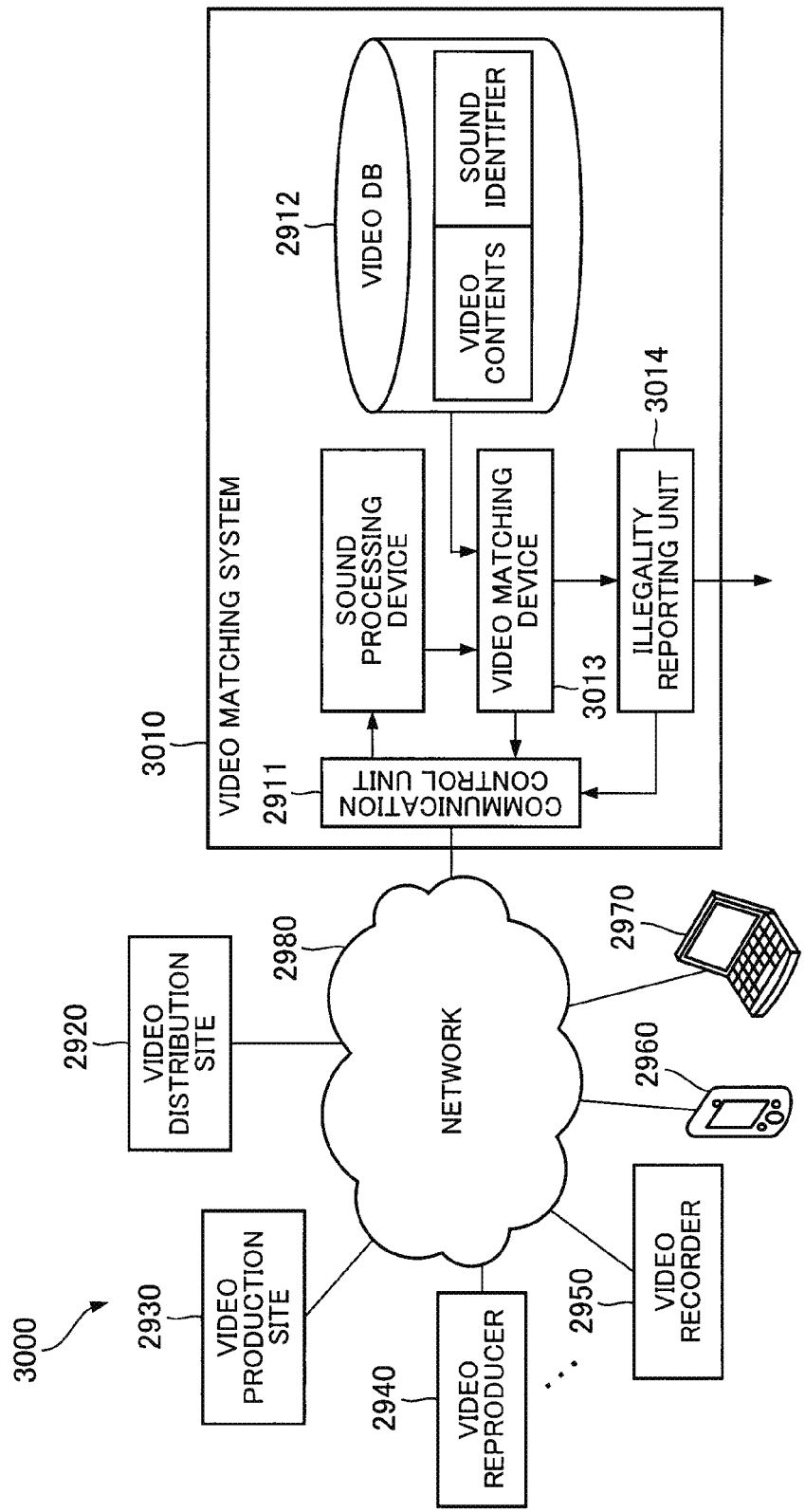
FIG. 30 is a block diagram showing a structure of a video processing system according to the eleventh exemplary embodiment of the present invention.

FIG. 30 is a block diagram showing a structure of a video processing system 3000 according to this exemplary embodiment.

The video processing system 3000 of FIG. 30 includes a video matching system 3010 including the sound processing device of this exemplary embodiment.

The video matching system 3010 includes the communication control unit 2911 which receives the sound signal via the network 2980 and sends the identified result. The received sound signal is inputted to the sound processing device of this exemplary embodiment and the sound identifier is generated.

The video DB 2912 accumulates the sound identifiers generated in advance by correlating them to the image contents or their ID.

A video matching device 3013 matches the sound identifier which the sound processing device of this exemplary embodiment generated and the sound identifiers accumulated in the video DB 2912, and in case there exist the video contents which agree within a predetermined range, notifies an illegality reporting unit 3014. The illegality reporting unit 3014 reports that there exists illegality in the image contents of the received sound signal via the communication control unit 2911.

Similar equipment as FIG. 29 which sends the sound signal in order to match the image contents is connected via the network 2980. Further, the connected equipment does not matter as far as it is one which can send the sound signal to the video matching system 3010 via the network.

[The Twelfth Exemplary Embodiment]

Next, a video processing system according to the twelfth exemplary embodiment of the present invention to which the sound processing device of the present invention mentioned above is applied will be explained.

The video processing system according to this exemplary embodiment is one which applied the sound processing device of the present invention mentioned above to a video matching system which matches the image contents on the basis of the sound signal and so on which is being sent from various equipment via a network. In the video matching system of this exemplary embodiment, both of the sound identifier and an image identifier are used for matching the image contents.

Further, determination of illegality may make the case where both of the sound identifiers and the image identifiers agree a condition or the case where either the sound identifiers or the image identifiers agree the condition. Since the structure and operation of the sound processing device are described in the second to the seventh exemplary embodiment, their detailed explanation will be omitted.

According to this exemplary embodiment, matching of the image contents can be carried out with little amount of information and with high accuracy.

<<Structure of the Sound Processing System>>

Figure 31:
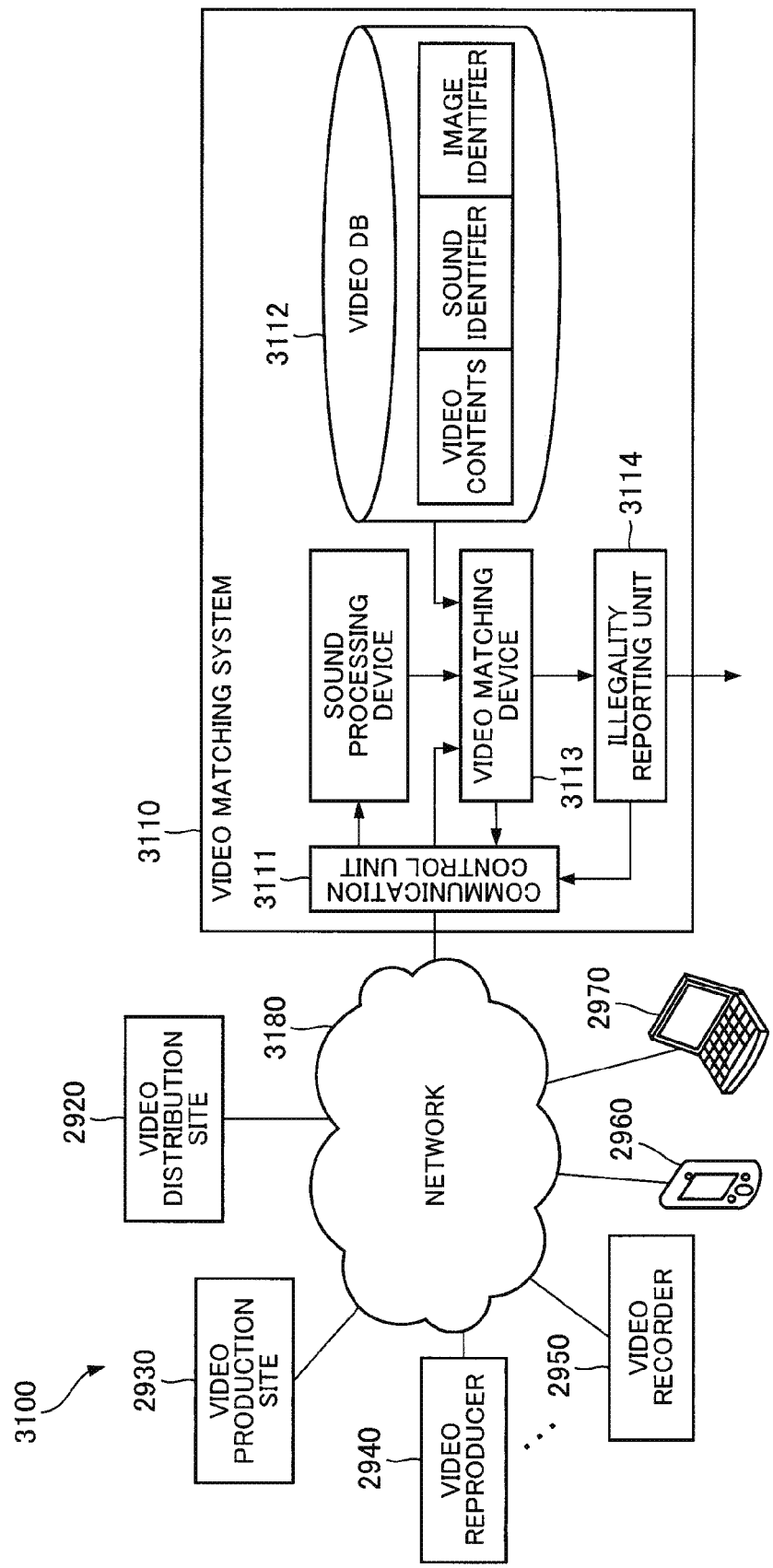
FIG. 31 is a block diagram showing a structure of a video processing system according to the twelfth exemplary embodiment of the present invention.

FIG. 31 is a block diagram showing a structure of a video processing system 3100 according to this exemplary embodiment.

The video processing system 3100 of FIG. 31 includes a video matching system 3110 including the sound processing device of this exemplary embodiment.

The video matching system 3110 includes a communication control unit 3111 which receives the sound signal and the image identifier from various equipment via a network 3180 and sends the matching result to the various equipment. The received sound signal is inputted to the sound processing device of this exemplary embodiment and the sound identifier is generated.

A video DB 3112 accumulates the sound identifiers and the image identifiers generated in advance by correlating them to the image contents or their ID. Further, as for the image identifier, an image identifier (so-called frame characteristic amount) generated from a frame of the image by a difference (of brightness) in the partial region pair similar to this exemplary embodiment may be used, or other publicly known image identifiers may also be used.

A video matching device 3113 matches the sound identifier which the sound processing device of this exemplary embodiment generated and the sound identifiers accumulated in the video DB 3112 and at the same time, matches the image identifier which the communication control unit 3111 received and the image identifiers accumulated in the video DB 3112.

In case there exist video contents which agree in both or in either one within a predetermined range, it notifies the illegality reporting unit 2714. An illegality reporting unit 3114 reports that there exists illegality in the image contents of the received sound signal and the image identifier via the communication control unit 3111.

Similar equipment as FIG. 29 which sends the sound signal and the image identifier in order to match the image contents is connected via the network 3180. Further, the connected equipment does not matter as far as it is one which can send the sound signal and the image identifier to the video matching system 3110 via the network.

Also, in this exemplary embodiment, a structure including an image processing device in which the equipment generates the image identifier from the image signal included in the video signal while synchronizing with the sound processing device is considered. However, when communication capacity of the network 3180 is enough, the video processing device may be arranged in the video matching system 3110.

[Other Exemplary Embodiments]

Although exemplary embodiments of the present invention are mentioned in detail as above, a system or a device which combined the separate characteristics included in the respective exemplary embodiments in any way is also included in the category of the present invention.

Also, the present invention may be applied to a system including a plurality of equipment or may be applied to a device of stand-alone. Further, the present invention is applicable in case the control program which realizes the functions of the exemplary embodiment is supplied to the system or the device directly or remotely.

Accordingly, the control program installed in a computer in order to realize the functions of the present invention by the computer, a medium which stores the control program, or a WWW (World Wide Web) server which makes the control program to be downloaded is also included in the category of the present invention.

Although the present invention has been explained with reference to the exemplary embodiments as above, the present invention is not limited to the exemplary embodiments mentioned above. Various changes which a person skilled in the art can understand within the scope of the present invention can be performed in the composition of the present invention and details.

This application claims priority based on Japanese Patent Application No. 2011-155541 filed on Jul. 14, 2011 and the disclosure thereof is incorporated herein in its entirety.

The invention claimed is:

1. A sound processing device comprising:
a time-frequency analysis unit which generates a time-frequency plane from a sound signal through time-frequency analysis;
a region characteristic amount extraction unit which, for a plurality of partial region pairs which is defined on the time-frequency plane and of which at least either of shapes of two partial regions or positions of the two partial regions differ from one another, extracts a region characteristic amount from each partial region;
a sound identifier generation unit which generates a sound identifier using a difference value of the region characteristic amounts extracted from each partial region, wherein the sound identifier generation unit comprises a memory unit which memorizes a comparison and a quantization method by correlating them to the partial region pair, and performs comparison and quantization by the comparison and the quantization method corresponding to the partial region pair; and
a processor configured to perform at least one function of at least one of the time-frequency analysis unit, the region characteristic amount extraction unit, and the sound identifier generation unit.

2. The sound processing device according to claim 1, wherein the sound identifier generation unit includes an element generation unit which generates a sound identifier element by using the region characteristic amounts which are extracted from two partial regions included in the partial region pair, and generates the sound identifier which is a set of the sound identifier elements generated by the element generation unit, the set being generated by combining the sound identifier elements by a number of the plurality of partial region pairs.

3. The sound processing device according to claim 2, wherein the element generation unit quantizes a difference value of the region characteristic amounts extracted by the region characteristic amount extraction unit, and generates the sound identifier element.

4. The sound processing device according to claim 3, wherein the quantization is quantization into three values by a predetermined quantization boundary.

5. The sound processing device according to claim 4, wherein the element generation unit generates a first quantized value when the difference value of the region characteristic amounts extracted by the region characteristic amount extraction unit is between a plus quantization boundary and a minus quantization boundary, generates a second quantized value when it is larger than the plus quantization boundary, and generates a third quantized value when it is smaller than the minus quantization boundary.

6. The sound processing device according to claim 5, wherein the element generation unit comprises a second quantization boundary decision unit which decides the quantization boundary so that a proportion of the partial region pairs which becomes the first quantized value, the second quantized value, and the third quantized value may become even.

7. The sound processing device according to claim 4, wherein the element generation unit comprises a first quantization boundary decision unit which decides the quantization boundary on the basis of a distribution of the difference values of the region characteristic amounts extracted by the region characteristic amount extraction unit.

8. The sound processing device according to claim 4, wherein the element generation unit comprises a third quantization boundary decision unit which sorts absolute values of the difference values of the region characteristic amounts extracted by the region characteristic amount extraction unit, and decides a value at a position of a prescribed proportion from a highest rank or a lowest rank as the quantization boundary.

9. A sound processing system comprising: the sound processing device according to claim 1 and a sound matching device which performs matching of a sound by using the sound identifier generated by the sound processing device.

10. A sound processing system comprising: the sound processing device according to claim 1, and a sound identification device which identifies a sound by using the sound identifier generated by the sound processing device.

* * * * *